(12) United States Patent
Tanimoto

(10) Patent No.: US 9,037,731 B2
(45) Date of Patent: May 19, 2015

(54) RELAY COMMUNICATION SYSTEM AND RELAY SERVERS

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 229 days.

(21) Appl. No.: 13/994,188

(22) PCT Filed: Oct. 17, 2011

(86) PCT No.: PCT/JP2011/073875
§ 371 (c)(1),
(2), (4) Date: Jun. 14, 2013

(87) PCT Pub. No.: WO2012/081305
PCT Pub. Date: Jun. 21, 2012

(65) Prior Publication Data
US 2013/0275604 A1    Oct. 17, 2013

(30) Foreign Application Priority Data

Dec. 16, 2010 (JP) ................................ 2010-280041

(51) Int. Cl.
H04L 29/06 (2006.01)
H04L 12/46 (2006.01)
H04L 12/54 (2013.01)

(52) U.S. Cl.
CPC ........ *H04L 65/1069* (2013.01); *H04L 12/4675* (2013.01); *H04L 12/5696* (2013.01)

(58) Field of Classification Search
CPC .................................................. H04L 65/1069
USPC .......... 709/227, 246, 249, 230; 370/392, 235, 370/469
See application file for complete search history.

(56) References Cited

U.S. PATENT DOCUMENTS 7,724,715 B2 * 5/2010 Meier ............................ 370/338
8,356,116 B2 * 1/2013 Tanimoto ...................... 709/249
(Continued)

FOREIGN PATENT DOCUMENTS

| JP | 2008-129991 A | 6/2008 |
| JP | 2010-068051 A | 3/2010 |
| JP | 2010-268312 A | 11/2010 |

OTHER PUBLICATIONS

"Relaying DHCP Packets to a Remote Server"—HP, Oct. 2009 http://www.hp.com/rnd/support/config_examples/5300xl_dhcp_relay.pdf.*
Official Communication issued in International Patent Application No. PCT/JP2011/073875, mailed on Dec. 13, 2011.
(Continued)

*Primary Examiner* — Randy Scott
(74) *Attorney, Agent, or Firm* — Keating & Bennett, LLP

(57) ABSTRACT

A virtual network is dynamically created when constructing a relay communication system including a plurality of relay servers that are arranged to communicate with each other. In the relay communication system, the VLAN client terminals defining a VLAN group are allowed to share VLAN group information. In addition, a VLAN session between VLAN devices as activatable VLAN client terminals is established based on the VLAN group information, and the VLAN devices are allowed to share virtual address information created when the VLAN group is activated. If the VLAN device defining the activated VLAN group is suspended, suspension of the VLAN device is notified, and a VLAN device about which the suspension has been notified is deleted from the virtual address information. The VLAN session related to the VLAN device about which the suspension has been notified is closed.

8 Claims, 22 Drawing Sheets

(56) References Cited

U.S. PATENT DOCUMENTS

2008/0288591 A1   11/2008  Tanimoto
2011/0161525 A1    6/2011  Tanimoto
2012/0057602 A1    3/2012  Tanimoto

OTHER PUBLICATIONS

English translation of Official Communication issued in corresponding International Application PCT/JP20111073875, mailed on Jun. 27, 2013.

* cited by examiner

FIG. 7

```
<?xml version="1.0" encoding="UFT-8" ?>
- <root>
  - <site id="serverA@trial.net" name="serverA" stat="active">                          } ─ 301-1
      <node div="dev" group="1279671471393.clientA1.rd.002@serverA.trial.net"
        id="clientA1.rd.002@serverA.trial.net" name="clientA1"
        site="serverA@trial.net" />
      <node div="dev" group="1279671471393.clientA1.rd.002@serverA.trial.net"     ⎬ ─ 302-1
        id="clientA2.rd.002@serverA.trial.net" name="clientA2"
        site="serverA@trial.net" />
    </site>                                                                              ─ 301-2
  - <site id="serverB@trial.net" name="serverB" stat="active">                          }
      <node div="dev" group="1279671471393.clientA1.rd.002@serverA.trial.net"
        id="clientB1.rd.002@serverB.trial.net" name="clientB1"
        site="serverB@trial.net" />
      <node div="dev" group="1279671471393.clientA1.rd.002@serverA.trial.net"     ⎬ ─ 302-2
        id="clientB2.rd.002@serverB.trial.net" name="clientB2"
        site="serverB@trial.net" />
    </site>                                                                              ─ 301-3
  - <site id="serverC@trial.net" name="serverC" stat="active">                          }
      <node div="dev" group="1279671471393.clientA1.rd.002@serverA.trial.net"
        id="clientC1.rd.002@serverC.trial.net" name="clientC1"                    ⎬ ─ 302-3
        site="serverC@trial.net" />
    </site>
</root>
```

FIG. 8

```
<?xml version="1.0" encoding="UFT-8" ?>
- <root>
    <node addr="192.168.2.1" div="dev" expr="1213935978484"
      group="1279671471393.clientA1.rd.002@serverA.trial.net"
      id="clientA2.rd.002@serverA.trial.net" name="clientA2" pass="abc"
      port="50700" />
    <node addr="192.168.1.30" div="dev" expr="1213935978484"
      group="1279671471393.clientA1.rd.002@serverA.trial.net"
      id="clientA1.rd.002@serverA.trial.net" name="clientA1" pass="def" port="0" />
</root>
```

```
<?xml version="1.0" encoding="UFT-8" ?>
- <root>
    <node addr="192.100.1.3" div="dev" expr="1213935978484"
      group="1279671471393.clientA1.rd.002@serverA.trial.net"
      id="clientB1.rd.002@serverB.trial.net" name="clientB1" pass="abc"
      port="50700" />
    <node addr="192.100.1.2" div="dev" expr="1213935978484"
      group="1279671471393.clientA1.rd.002@serverA.trial.net"
      id="clientB2.rd.002@serverB.trial.net" name="clientB2" pass="noui"
      port="50700" />
  </root>
```

```
<?xml version="1.0" encoding="UFT-8" ?>
- <root>
    <node addr="200.1.2.1" div="dev" expr="1213935978484"
      group="1279671471393.clientA1.rd.002@serverA.trial.net"
      id="clientC1.rd.002@serverC.trial.net" name="clientC1" pass="abc"
      port="50700" />
  </root>
```

```
<?xml version="1.0" encoding="UFT-8" ?>
<root>
<vnet auto="0" group="1279671471393.clientA1.rd.002@trial.net"           ⎫
  id="1279672104671.clientA1.rd.002@trial.net" lastmod="1279672104671"    ⎬ 71
  name="vlangroup1">                                                     ⎭
<dev id="clientA1.rd.002@serverA.trial.net" />   ⎫
<dev id="clientB1.rd.002@serverB.trial.net" />   ⎬ 72
<dev id="clientB2.rd.002@serverB.trial.net" />   ⎪
<dev id="clientC1.rd.002@serverC.trial.net" />   ⎭
<ssn sp="serverA.trial.net" ep="serverB@trial.net" />   ⎫
<ssn sp="serverA.trial.net" ep="serverC@trial.net" />   ⎬ 73
<ssn sp="serverB.trial.net" ep="serverC@trial.net" />   ⎭
</vnet>
</root>
```

FIG. 14

```xml
<?xml version="1.0" encoding="UFT-8" ?>
- <root>
  - <site id="serverA@trial.net" name="serverA" stat="active">
      <node div="dev" group="1279671471393.clientA1.rd.002@serverA.trial.net"
        id="clientA1.rd.002@serverA.trial.net" name="clientA1"
        site="serverA@trial.net" />
      <node div="dev" group="1279671471393.clientA1.rd.002@serverA.trial.net"
        id="clientA2.rd.002@serverA.trial.net" name="clientA2"
        site="serverA@trial.net" />
    </site>
  </root>
```

```xml
<?xml version="1.0" encoding="UFT-8" ?>
- <root>
  - <site id="serverB@trial.net" name="serverB" stat="active">
      <node div="dev" group="1279671471393.clientA1.rd.002@serverA.trial.net"
        id="clientB1.rd.002@serverB.trial.net" name="clientB1"
        site="serverB@trial.net" />
      <node div="dev" group="1279671471393.clientA1.rd.002@serverA.trial.net"
        id="clientB2.rd.002@serverB.trial.net" name="clientB2"
        site="serverB@trial.net" />
    </site>
  </root>
```

```xml
<?xml version="1.0" encoding="UFT-8" ?>
- <root>
  - <site id="serverC@trial.net" name="serverC" stat="active">
      <node div="dev" group="1279671471393.clientA1.rd.002@serverA.trial.net"
        id="clientC1.rd.002@serverC.trial.net" name="clientC1"
        site="serverC@trial.net" />
  </site>
  </root>
```

31-3, 311-3, 312-3

RELAY COMMUNICATION SYSTEM AND RELAY SERVERS

BACKGROUND OF THE INVENTION

1. Field of the Invention

The present invention relates to a relay communication system including a plurality of relay servers that can communicate with each other, a plurality of client terminals, and LANs connecting the client terminal to the relay server, and also to a relay server included in the relay communication system.

2. Description of the Related Art

In some systems, client terminals connected to remote local area networks (LANs) communicate with each other through a wide area network (WAN). A virtual private network (VPN) makes it possible to configure a virtual network in which the remote local area networks (LANs) are connected directly with each other. However, in the virtual private network (VPN), it is difficult to configure a network that is expandable and flexible.

A relay communication system shown in Japanese Laid-open Patent Publication No. 2008-129991 can configure a virtual network in which the remote local area networks (LANs) are directly connected with each other, as in the virtual private network (VPN). Moreover, in the relay communication system, it is easy to configure a network with expandability and flexibility, unlike the virtual private network (VPN).

In the relay communication system shown in Japanese Laid-open Patent Publication No. 2008-129991, the number and the connection states of LANs and client terminals may be changed. However, in Japanese Laid-open Patent Publication No. 2008-129991, no specific means is disclosed that confirms in real time changes to the number of client terminals and connection states of client terminals when the relay server designates a destination for communication. In Japanese Laid-open Patent Publication No. 2008-129991, no specific means is disclosed to dynamically configure a virtual network between a client terminal and a relay server.

SUMMARY OF THE INVENTION

Preferred embodiments of the present invention dynamically create a virtual network when configuring a relay communication system that includes a plurality of relay servers that are able to communicate with each other.

Hereinafter, a plurality of preferred embodiments of the present invention which correct problems in the prior art are disclosed. The preferred embodiments and various features thereof can be combined with each other as necessary.

According to one preferred embodiment of the present invention, a relay communication system includes a first network, a second network. a first relay server, a second relay server, and client terminals. The first relay server is connected to the first network. The second relay server is connected to the second network, and is configured to communicate with the first relay server via a third network. One or more client terminals are connected to the first relay server via the first network. Another one or more client terminals are connected to the second relay server via the second network.

Each of the first relay server, the second relay server, the one or more client terminals connected to the first relay server, and the one or more client terminals connected to the second relay server includes a relay group information storage unit, a relay server information storage unit, an information sharing unit, and a VLAN group information control unit.

The relay group information storage unit is configured to store relay group information that indicates the first relay server, the second relay server, the one or more client terminals connected to the first relay server and one or more client terminals connected to the second relay server define a relay group. The relay server information storage unit is configured to store relay server information including activation information of the first relay server, activation information of the second relay server, activation/registration information of the one or more client terminals connected to the first relay server, and activation/registration information of the one or more client terminals connected to the second relay server. The information sharing unit is configured to allow the first relay server, the second relay server, the one or more client terminals connected to the first relay server, and the one or more client terminals connected to the second relay server, to share the relay group information and the relay server information. The VLAN group information control unit is programmed and configured to allow VLAN client terminals defining a VLAN group in the relay group to share VLAN group information. At least two of the one or more client terminals connected to the first relay server and the one or more client terminals connected to the second relay server are the VLAN client terminals. The VLAN group information includes hub information including identification information of the first relay server and identification information of the second relay server to which the VLAN client terminal is connected, session information that indicates a connecting-side and a connected-side of a session established between the first relay server and the second relay server, and identification information that identifies the VLAN client terminals.

Each of the first relay server and the second relay server further includes an activation command control unit, a VLAN session control unit, and a suspension processing unit. The activation command control unit is programmed and configured to transmit a response signal including address information of a VLAN device as an activatable VLAN client terminal in a case of receiving an activation instruction of the VLAN group. The VLAN session control unit is programmed and configured to establish a hub session as a VLAN session between the first relay server and the second relay server based on the session information, and establish a device session as a VLAN session between the first relay server or the second relay server and the VLAN device that is connected to the first relay server or the second relay server. The suspension processing unit is configured to provide notification of suspension of the VLAN device.

Each of the one or more client terminals connected to the first relay server and the one or more client terminals connected to the second relay server further includes a virtual address control unit. The virtual address control unit is programmed and configured to create virtual address information related to the VLAN device based on the response signal, and transmit the virtual address information to the VLAN device.

During a time when at least two VLAN devices are communicating with each other using the virtual address information and the VLAN session, if the suspension processing unit notifies of the suspension of the VLAN device, the virtual address control unit deletes the VLAN device about which the suspension has been notified from the virtual address information, and the VLAN session control unit is configured to close the VLAN session related to the VLAN device about which the suspension has been notified.

In this case, if the suspension processing unit notifies of suspension of the VLAN device during a time when at least two VLAN devices are communicating with each other using the virtual address information and the VLAN session, the virtual address control unit deletes the VLAN device to which the suspension has been notified from the virtual address information, and the VLAN session establishing unit closes the VLAN session related to the VLAN device to which the suspension has been notified.

In this case, the suspension of the operation of the VLAN devices occurring in the VLAN group can be quickly reflected on the VLAN session.

If operation of the first relay server or the second relay server is suspended during a time when at least two VLAN devices are communicating with each other using the virtual address information and the VLAN session, the suspension processing unit is preferably configured to provide notification of suspension of the one or more VLAN devices connected to the suspended first relay server or the one or more VLAN devices connected to the suspended second relay server.

The suspension processing unit preferably determines the number of the VLAN devices which are activated except the VLAN device about which the suspension has been notified, and if the number of the activated VLAN devices is one or less, the VLAN session control unit closes all of the VLAN sessions established in the VLAN group.

The virtual address information preferably includes a virtual IP address and a virtual MAC address given to the VLAN device.

According to another preferred embodiment of the present invention, a relay server is configured to serve as a second relay server connected to a second network, and communicate with a first relay server connected to a first network. The relay server includes a relay group information storage unit, a relay server information storage unit, an information sharing unit, a VLAN group information control unit, an activation command control unit, a relay server communication control, and a suspension processing unit.

The relay group information storage unit is configured to store relay group information that indicates the first relay server, the second relay server, one or more client terminals connected to the first relay server via the first network, and one or more client terminals connected to the second relay server via the second network define a relay group.

The relay server information storage unit is configured to store relay server information including activation information of the first relay server, activation information of the second relay server, activation/registration information of the one or more client terminals connected to the first relay server, and activation/registration information of the one or more client terminals connected to the second relay server.

The information sharing unit is configured to allow the first relay server, the second relay server, the one or more client terminals connected to the first relay server, and one or more client terminals connected to the second relay server, to share the relay group information and the relay server information.

The VLAN group information control unit is programmed and configured to allow VLAN client terminals defining a VLAN group in the relay group to share VLAN group information. At least two of the one or more client terminals connected to the first relay server and the one or more client terminals connected to the second relay server are the VLAN client terminals.

The VLAN group information includes hub information including identification information of the first relay server and identification information of the second relay server, to which the VLAN client terminal is connected, session information that indicates a connecting-side and a connected-side of a session established between the first relay server and the second relay server, and identification information that identifies the VLAN client terminals.

The activation command control unit is programmed and configured to transmit a response signal including address information of a VLAN device as an activatable VLAN client terminal in a case of receiving an activation instruction of the VLAN group.

The VLAN session control unit is programmed and configured to establish a hub session as a VLAN session between the first relay server and the second relay server based on the session information, and establish a device session as a VLAN session with the VLAN device connected to the second relay server.

The relay server communication control unit is programmed and configured to control communication between the VLAN devices, the communication being performed using virtual address information created for a VLAN device as an activatable VLAN client terminal among the VLAN client terminals defining the VLAN group based on the response signal, and the VLAN session. The suspension processing unit is configured to provide notification of suspension of the VLAN device. If the suspension processing unit notifies of suspension of the VLAN device, during a time when at least two VLAN devices are communicating with each other using the virtual address information and the VLAN session, the VLAN session control unit is programmed and configured to close the VLAN session related to the VLAN device about which suspension has been notified.

If operation of the first relay server or the second relay server is suspended during a time when at least two VLAN devices are communicating with each other using the virtual address information and the VLAN session, the suspension processing unit is preferably configured to provide notification of suspension of the one or more VLAN devices connected to the suspended first relay server or the one or more VLAN devices connected to the suspended second relay server.

The suspension processing unit preferably determines the number of the activated VLAN devices except the VLAN device about which the suspension has been notified. If the number of the activated VLAN devices is one or less, the VLAN session control unit is configured to close all of the VLAN sessions established in the VLAN group.

The virtual address information preferably includes a virtual IP address and a virtual MAC address given to the VLAN device.

According to preferred embodiments of the present invention, when constructing a relay communication system including a plurality of relay servers that can communicate with each other, a virtual network can be dynamically created, and the client terminals can communicate with each other as VLAN devices using the virtual address and the VLAN session.

Furthermore, the suspension of the operation of the VLAN devices occurring in the activated VLAN group can be quickly reflected on the VLAN session.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a view showing a detailed configuration of relay server information according to a preferred embodiment of the present invention.

FIG. 8 is a view showing a schematic configuration of client terminal information stored in a first relay server according to a preferred embodiment of the present invention.

FIG. 9 is a view showing a schematic configuration of client terminal information stored in a second relay server according to a preferred embodiment of the present invention.

FIG. 10 is a view showing a schematic configuration of client terminal information stored in a third relay server according to a preferred embodiment of the present invention.

FIG. 11 is a view showing a detailed configuration of VLAN group information according to a preferred embodiment of the present invention.

FIG. 14 is a view showing the detailed configuration of relay server information before the exchange according to a preferred embodiment of the present invention.

FIG. 15 is a view showing the detailed configuration of the relay server information before the exchange according to a preferred embodiment of the present invention.

FIG. 16 is a view showing the detailed configuration of the relay server information before the exchange according to a preferred embodiment of the present invention.

DETAILED DESCRIPTION OF THE PREFERRED EMBODIMENTS

In a relay communication system according to a preferred embodiment of the present invention, client terminals can communicate with each other through a wide area network (WAN), through a plurality of relay servers realizing a function similar to hubs.

Figure 1:
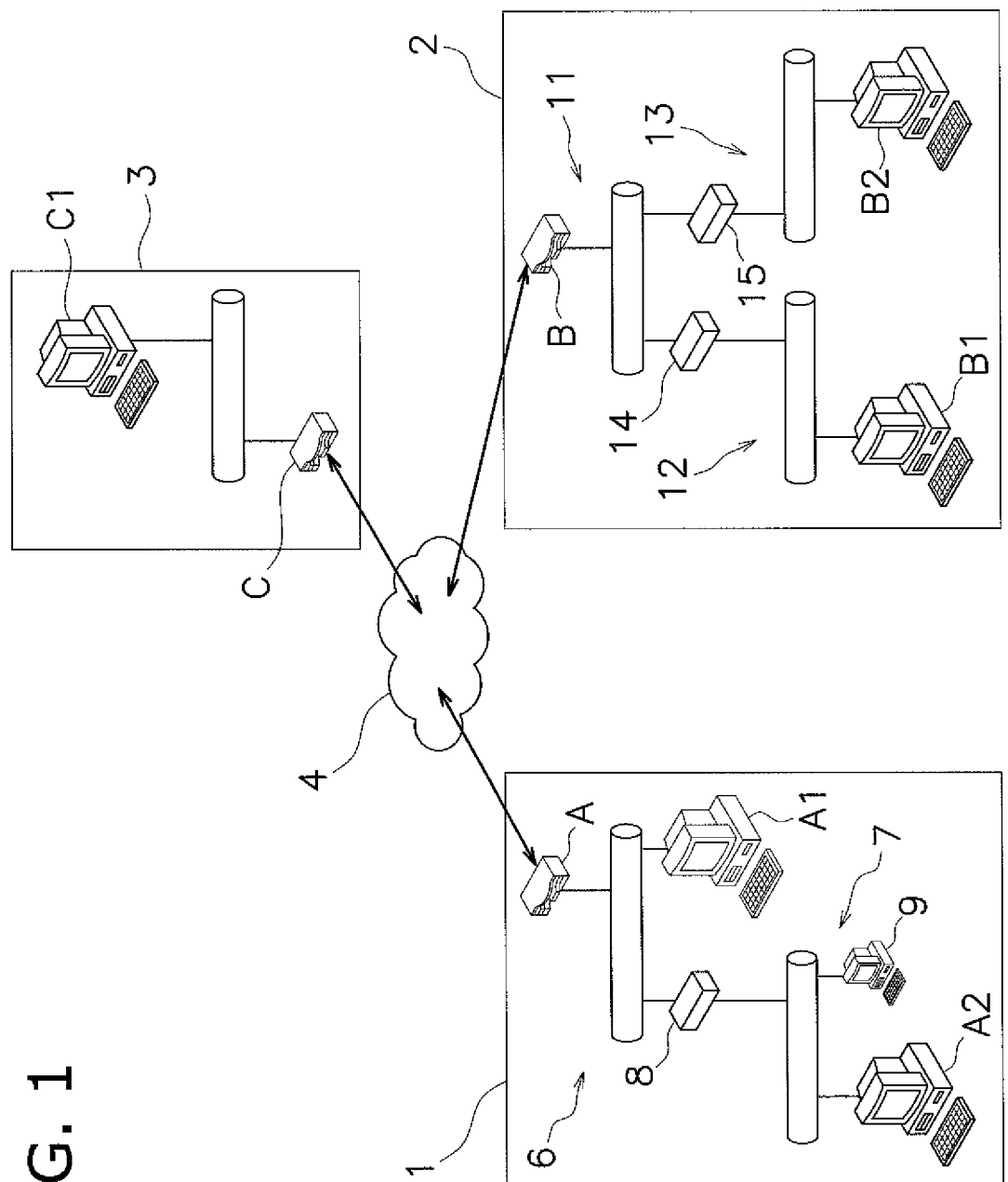
FIG. 1 is a schematic diagram the overall configuration of a relay communication system according to a preferred embodiment of the present invention.

Hereinafter, referring to drawings, preferred embodiments of the present invention will be explained. FIG. 1 shows an overall structure of the relay communication system according to a preferred embodiment of the present invention. The relay communication system is preferably defined by a first LAN 1, a second LAN 2, a third LAN, a wide area network (WAN) 4. The first LAN 1, the second LAN 2 and the third LAN 3 are a small-sized network remotely provided. The wide area network (WAN) 4 is a large-scale network such as the Internet.

In the present preferred embodiment, as explained in detail later, a first relay server A of the first LAN 1, a second relay server B of the second LAN 2, a third relay server C of the third LAN 3 preferably define a first relay group as a relay server group.

The first LAN 1 preferably includes a fourth LAN 6 and a fifth LAN 7, and the fourth LAN 6 and the fifth LAN 7 are connected with each other via a first general purpose router 8. In the fourth LAN 6, a first relay server A and a first client terminal A1 are preferably connected with each other. In the fifth LAN 7, a second client terminal A2 and a second communication equipment 9 are connected with each other.

The second LAN 2 includes a sixth LAN 11, a seventh LAN 12, and an eighth LAN 13. The sixth LAN 11 and the seventh LAN 12 are connected with each other via a second general purpose router 14, and the sixth LAN 11 and the eighth LAN 13 are connected with each other through a third general purpose router 15. The second relay server B belongs to the sixth LAN 11. The third client terminal B1 is connected to the seventh LAN 12. A fourth client terminal B2 is connected to the eighth LAN 13.

In the third LAN 3, the third relay server C and the fifth client terminal C1 are connected with each other.

The first client terminal A1, the second client terminal A2, the third client terminal B1, the fourth client terminal B2, and the fifth client terminal C1 are preferably personal computers, for example. The second communication equipment 9 is also preferably a personal computer, for example.

The first relay server A, the second relay server B and the third relay server C relay communication among the first client terminal A1, the second client terminal A2, the third client terminal B1, the fourth client terminal B2, and the fifth client terminal C1. A communication protocol among the first relay server A, the second relay server B, and the third relay server C is not particularly limited.

The relay server is connected to the wide area network (WAN) as well as the LAN, so that the relay sever can communicate with relay servers located in other LANs as well as with client terminals connected to the same LAN. Accordingly, each of the relay servers is given a global IP address as well as a private IP address.

Figure 2:
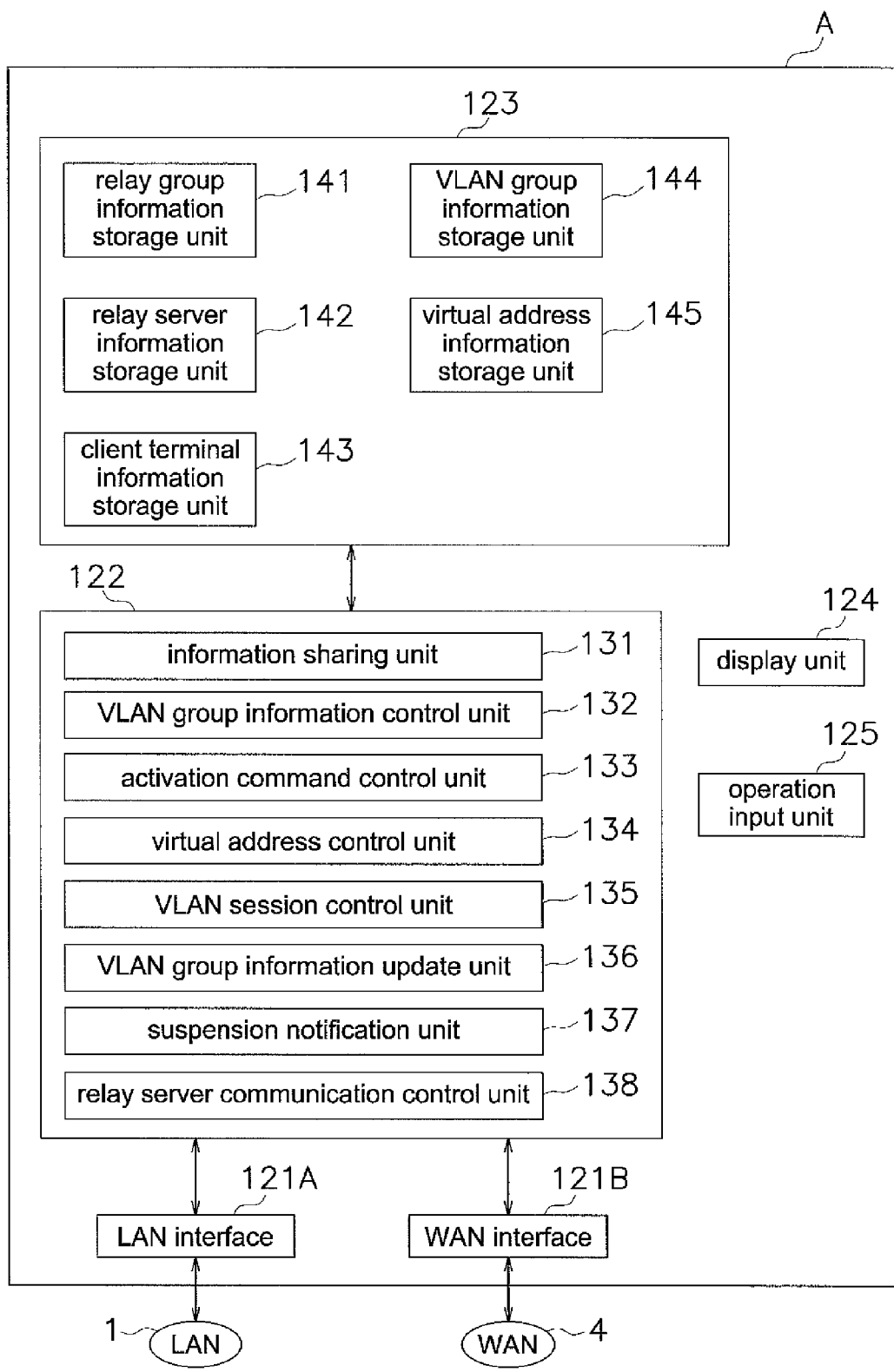
FIG. 2 is a block diagram showing a configuration of a first relay server according to a preferred embodiment of the present invention.

FIG. 2 shows constituent elements of the first relay server A according to a preferred embodiment of the present invention.

The first relay server A preferably includes a LAN interface 121A, a WAN interface 121B, a control unit 122, a database storage unit 123, a display unit 124, and an operation input unit 125.

The LAN interface 121A executes communication with a terminal in the first LAN 1 using the private IP address. The WAN interface 121B executes communication with the wide area network (WAN) 4 using the global IP address.

The control unit 122 is preferably a CPU having functions of the control and operation, for example, and can execute various processes according to loaded programs. The control unit 122 in the present preferred embodiment preferably includes an information sharing unit 131, a VLAN group information control unit 132, an activation command control unit 133, a virtual address control unit 134, a VLAN session control unit 135, a VLAN group information update unit 136, and a relay server communication control unit 137.

The information sharing unit 131 creates and updates relay group information, relay server information, and client terminal information, which will be described later. Moreover, the information sharing unit 131 shares the created and updated relay group information with a relay server in the relay group and client terminals connected to the relay server, and stores it in a relay group information storage unit 141 (described later). The information sharing unit 131 shares the created and updated relay server information with a relay server in the relay group and client terminals connected to the relay server, and stores it in a relay server information storage unit 142 (described later). The information sharing unit 131 shares the created and updated client terminal information with relay servers and client terminals in the relay group, and stores it in a client terminal information storage unit 143 (described later).

The VLAN group information control unit 132 shares a VLAN group information (described later) with a VLAN client terminal in the relay group and a relay server connected to the VLAN client terminal, and stores it in a VLAN group information storage unit 144 (described later). The VLAN client terminal is a client terminal that constitutes a VLAN group in the relay group.

If the activation command control unit 133 receives activation information of the VLAN group from a client terminal that has received an activation instruction from a user, it determines whether or not a VLAN group that is the same as the received VLAN group has already been activated. The activation information preferably includes an activation command, an activation time, and VLAN group information of the VLAN group. The activation command control unit 133 transmits, if the VLAN group has already been activated, a join-in-progress signal to a client terminal as a transmission source of the activation instruction, and executes a process of permitting the client terminal to join in-progress the VLAN group. The join-in-progress signal is a signal which permits the join-in-progress to the VLAN group, and is transmitted together with later-described virtual address information.

Specifically, the activation command control unit 133 refers, if the same VLAN group has already been activated, to the activation time of the activation information which has activated the VLAN group before and the activation time of the received activation information, and determines that the activation information including the earlier activation time is valid.

After that, the activation command control unit 133 determines whether or not the client terminal as a transmission source of the invalid activation information has already received the initialization command and virtual address information related to the valid activation information including the earlier activation time. Then, the activation command control unit 133 transmits, if it has already received the initialization command and virtual address information, the above-described join-in-progress signal to a client terminal as a transmission source of the invalid activation information. Here, the activation command control unit 133 finishes a process of joining in-progress to the VLAN group, if it has not received initialization command and virtual address information with regard to the valid activation information.

On the other hand, if it is determined that the received activation information is valid, the activation command control unit 133 executes an activation process of the VLAN group related to the valid activation information. First, the activation command control unit 133 extracts a VLAN client terminal connected to the first relay server A from the VLAN group information. The activation command control unit 133 determines whether or not the extracted VLAN client terminal is activatable. The "activatable VLAN client terminal" refers to a client terminal that is currently logged in and is not currently joining other VLAN groups. The activation command control unit 133 refers to the relay server information stored in the relay server information storage unit 142, and determines whether or not the extracted VLAN client terminal is logging-in. Furthermore, the activation command control unit 133 transmits an activation command (described later), and determines that the extracted VLAN client terminal is activatable, the detail of which will be described later. Below, a VLAN client terminal which is determined as activatable by the activation command control unit 133 is called VLAN device.

If it is determined that there is a VLAN device, the activation command control unit 133 transmits a response signal including the IP address and the MAC address of the VLAN device to a client terminal as a transmission source of the valid activation information of the VLAN group. The detail of the VLAN group information will be described later.

If the virtual address control unit 134 receives the virtual address information and initialization command, it transmits the virtual address information and the initialization command to a VLAN device connected to the first relay server A.

The virtual address control unit 134 stores the virtual address information in the virtual address information storage unit 145 (described later). The detail of the virtual address information will be described later. The initialization command is a command related to the initialization of the VLAN interface 221B.

The virtual address control unit 234 deletes, if receiving suspension notification of the VLAN device from a suspension processing unit 137 (described later), a device to be suspended from the virtual address information stored in the virtual address information storage unit 145.

The VLAN session control unit 135 refers to the VLAN group information, and then establishes a hub session as a VLAN session with another relay server to which the VLAN device is connected. In addition, the VLAN session control unit 135 refers to the VLAN group information, and then establishes a device session as a VLAN session with VLAN devices connected to the first relay server A. The hub session is a session between the relay servers to which the VLAN device is connected. The device session is a session between the VLAN device and relay server to which the VLAN device is connected.

The VLAN session control unit 135 in this preferred embodiment establishes a VLAN session related to a client terminal as a transmission source of the join-in-progress command, when receiving a join-in-progress command (described later) and if a client terminal as a transmission source of the join-in-progress command is connected to the first relay server A.

The VLAN session control unit 135 closes the VLAN session related to a VLAN device to be suspended, if receiving notification of suspending the VLAN device from the suspension processing unit 137 (described later).

The VLAN group information update unit 136 allows the VLAN client terminals and the relay servers to which the VLAN client terminals are connected to share the updated VLAN group information if the VLAN group information is changed.

The suspension processing unit 137 provides notification of suspension of the VLAN device. The "suspension of the VLAN device" refers to a state in which the VLAN device cannot perform data communication.

Specifically, the suspension processing unit 137 provides notification of the suspension of the VLAN device which has logged out or the suspension of the VLAN device connected to relay server which has logged out, if the VLAN device or the relay server connected to the VLAN device logs out when the data is being transferred between the VLAN devices via the VLAN session. In addition, the suspension processing unit 137 may provide notification of the suspension of all of the VLAN devices in the VLAN group, if the client terminal receives an instruction of closing the VLAN group from a user.

In addition, the suspension processing unit 137 determines the number of the activated VLAN devices other than VLAN devices to which the suspension has been notified, and may provide notification of the suspension of all of the activated VLAN devices if the number of the activated LAN devices is one or less.

The relay server communication control unit 138 is preferably a processing unit that controls various communications via the LAN interface 121A and the WAN interface 121B, and controls various communications that are performed in accordance with a protocol such as, for example, TCP/IP, UDP, and SIP.

The relay server communication control unit 137 controls communication between the VLAN devices that uses the virtual address information and the VLAN session. Specifically, the relay server communication control unit 138 analyzes a communication packet received via the LAN interface 121A from a client terminal connected to the first relay server A. Then, if the communication packet includes a virtual address, the relay server communication control unit 138 refers to the virtual address, and transmits the communication packet via the hub session to other relay servers. Furthermore, the relay server communication control unit 138 analyzes, when receiving the communication packet from the other relay servers via the WAN interface 121B, the received communication packet. If the communication packet includes the virtual address, the relay server communication control unit 137 transmits the communication packet to a VLAN interface (described later) of a client terminal under the control of the first relay server A, to which the virtual address is assigned, via the device session. On the other hand, if the virtual address is not included, the relay server communication control unit 138 transmits the communication packet to a LAN interface (described later) of a client terminal under the control of the first relay server A.

The database storage unit 123 is preferably a hard disk drive or a non-volatile RAM, for example, and can store various data. The database storage unit 123 preferably includes a relay group information storage unit 141, a relay server information storage unit 142, a client terminal information storage unit 143, a VLAN group information storage unit 144, and a virtual address information storage unit 145. The detail of the information to be stored in the relay group information storage unit 141, the relay server information storage unit 142, the client terminal information storage unit 143, the VLAN group information storage unit 144 and the virtual address information storage unit 145 will be described later. It should be noted that constituent elements of the second relay server B and the third relay server C are preferably similar to those of the first relay server A, so the explanation thereof will be omitted.

The client terminal is preferably a terminal the user can directly operate. For example, the client terminal is preferably a personal computer used for day-to-day operations by the user. Each of the client terminals is given a private IP address uniquely managed in the same LAN.

Figure 3:
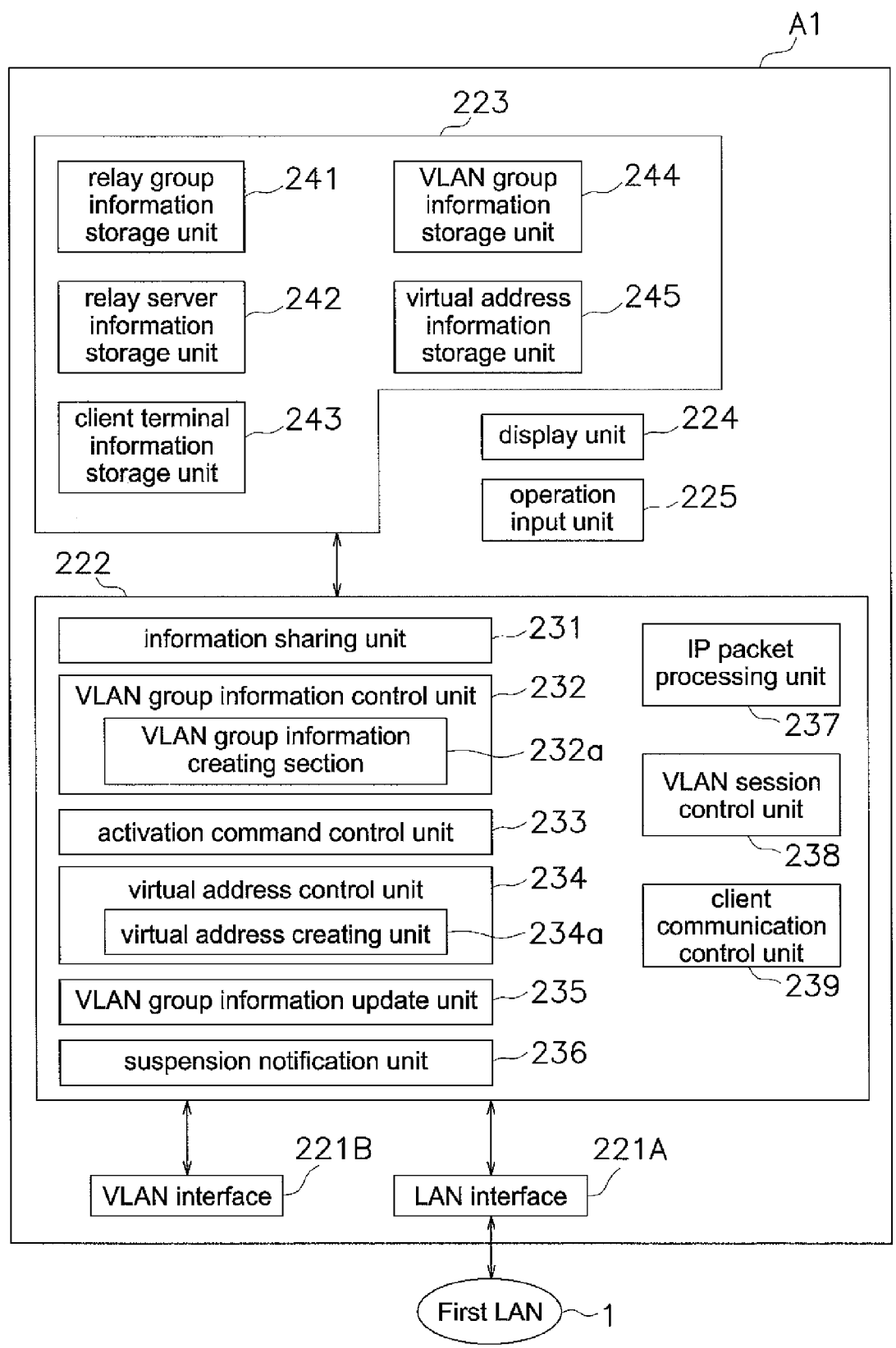
FIG. 3 is a block diagram showing a configuration of a first client terminal according to a preferred embodiment of the present invention.

FIG. 3 shows elements of the first client terminal A1. The first client terminal A1 preferably includes a LAN interface 221A, a VLAN interface 221B, a control unit 222, a database storage unit 223, a display unit 224, and an operation input unit 225.

The LAN interface 221A is arranged to execute communication with the first relay server A and other terminals in the first LAN 1 using the private IP address.

The VLAN interface 221B is arranged to execute communication with other terminal in the first relay group via the first relay server A using the virtual IP address (described later) and the device session.

The control unit 222 is preferably, for example, a CPU that includes control and operation functions, and is arranged and programmed to execute various processes according to the loaded program. The control unit 222 in this preferred embodiment preferably includes an information sharing unit 231, a VLAN group information control unit 232, an activation command control unit 233, a virtual address control unit 234, a VLAN group information update unit 235, a suspension notification unit 236, an IP packet processing unit 237, a VLAN session control unit 238, and a client communication control unit 239.

The information sharing unit 231 allows relay servers and client terminals connected to the relay servers in the relay group to share the relay group information, and stores it in the relay group information storage unit 241 (described later). Furthermore, the information sharing unit 231 allows relay servers and client terminals connected to the relay servers in the relay group to share the relay server information, and stores it in the relay server information storage unit 242 (described later). Furthermore, the information sharing unit 131 allows the relay servers and the client terminals in the relay group to share the client terminal information, and stores it in the client terminal information storage unit 243 (described later).

The VLAN group information control unit 232 shares the VLAN group information between the VLAN client terminal in the relay group and the relay server connected to the VLAN client terminal, and stores it in the VLAN group information storage unit 244 (described later). In addition, the VLAN group information control unit 232 preferably includes a VLAN group information creating section 232a that creates the VLAN group information, and transmits the created VLAN group information to the VLAN client terminal.

The activation command control unit 233 executes an activation process of the VLAN group. Specifically, when the activation command control unit 233 receives the selection for the VLAN group to be activated from the user, it transmits an activation command to an activated relay server among the relay servers connected to the VLAN client terminal. The activation command is a command for notifying of activation of the VLAN group, and is transmitted together with activation time and VLAN group information of the VLAN group. The activation command control unit 233 refers to the relay server information stored in the relay server information storage unit 242, and determines whether or not the extracted relay server is activatable.

When the activation command control unit 233 receives the response signal in response to the activation command from the relay server, it extracts the IP address and the MAC address of the VLAN device from the response signal.

The virtual address control unit 234 preferably includes a virtual address creating unit 234a. The virtual address creating unit 234a creates virtual address information when it receives a response signal including an IP address and a MAC address of the VLAN device. The virtual address control unit 234a is programmed and arranged to transmit the created virtual address information to a relay server to which the first client terminal A1 is connected. Furthermore, the virtual address control unit 234 is programmed and arranged to store the received virtual address information in the virtual address information storage unit 245, when receiving the virtual address information and the initialization command.

In addition, the virtual address control unit 234 refers to the virtual address information, and determines whether or not the virtual address can be determined for the first client terminal A1, when receiving the virtual address information and join-in-progress signal. If it is determined that the virtual address can be determined, the virtual address control unit 234 determines the virtual address for the first client terminal A1, and updates the virtual address information by adding the virtual address information of the first client terminal A1 to the virtual address information. After that, the virtual address control unit 234 transmits the updated virtual address information and join-in-progress command to a relay server to which the first client terminal A1 is connected. On the other hand, the virtual address control unit 234 finishes a process of joining in-process the VLAN group if it is determined that the virtual address cannot be determined for the first client terminal A1.

Furthermore, the virtual address control unit 234 deletes the VLAN device to be suspended from the virtual address information stored in the virtual address information storage unit 245, when receiving a notification of suspension of the VLAN device from the suspension processing unit 137.

When the VLAN group information is changed, the VLAN group information update unit 235 shares the updated VLAN group information with a VLAN client terminal and a relay server to which the VLAN client terminal is connected.

The suspension notifying unit 236 provides notification of closing of the VLAN group being activated after receiving an instruction from a user. Specifically, the suspension notification unit 236 receives an instruction of closing the whole VLAN group from a user, and provides notification of the suspension processing unit 137 of the connected first relay server A of the received instruction.

The IP packet processing unit 237 outputs the communication packet received from the LAN interface 221A to the client communication control unit 239. In addition, the IP packet processing unit 237 outputs the communication packet to the VLAN session control unit 238 when it receives the commutation packet including the virtual address via the VLAN interface 221B.

The VLAN session control unit 238 processes a communication packet including the virtual address, and allows a device session to function as a VLAN session. The VLAN session control unit 238 transmits a communication packet including the virtual address via the VLAN interface 221B, when it transmits the communication packet using the VLAN session. Furthermore, the VLAN session control unit 238 closes a device session established by the first client terminal A1 when receiving a request to close the device session from the first relay server A.

The client communication control unit 239 processes the communication packet other than the VLAN session, and controls various communications in accordance with a protocol such as, for example, TCP/IP, UDP, and SIP via the LAN interface 221A.

The database storage unit 223 is preferably a hard disk drive or a non-volatile RAM, for example, and can store various data. The database storage unit 223 preferably includes a relay group information storage unit 241, a relay server information storage unit 242, a client terminal information storage unit 243, a VLAN group information storage unit 244, and a virtual address information storage unit 245. The detail of information to be stored in the relay group information storage unit 241, the relay server information storage unit 242, the client terminal information storage unit 243, the VLAN group information storage unit 244, and the virtual address information storage unit 245 will be described later.

It should be noted that since the second client terminal A2, the third client terminal B1, the fourth client terminal B2, and the fifth client terminal C1 are preferably similar to the first client terminal A1, the explanation thereof will be omitted.

Figure 4:
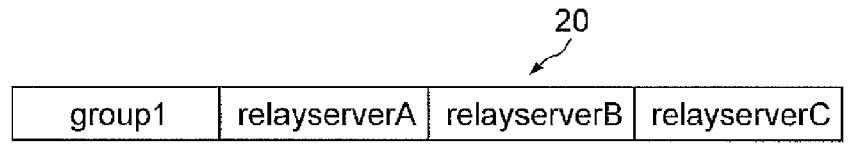
FIG. 4 is a view showing a schematic configuration of relay group information according to a preferred embodiment of the present invention.

FIG. 4 shows a schematic configuration of the relay group information 20 according to a preferred embodiment of the present invention. The relay group information 20 is preferably information indicating a summary of the relay groups in the relay communication system, and is stored in the relay group information storage unit 141 of the relay server and the relay group information storage unit 241 of the client terminal. FIG. 4 shows that first relay group preferably includes the first relay server A, the second relay server B, and the third relay server C.

Figure 5:
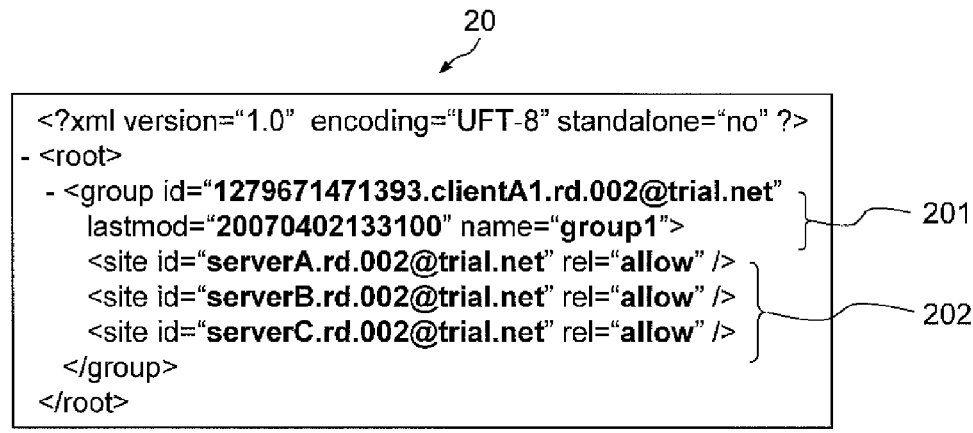
FIG. 5 is a view showing a detailed configuration of relay group information according to a preferred embodiment of the present invention.

FIG. 5 shows a detailed configuration of the relay group information 20. The relay group information 20 preferably includes upper information 201 and lower information 202.

The upper information 201 is information on the first relay group itself. "group id" indicates identification information of the relay group. "lastmod" indicates the latest update time of the relay group information. "name" indicates the name of the relay group.

The lower information 202 is information on the first relay server A, the second relay server B, and the third relay server C. "site id" indicates identification information of each relay server.

The relay group information 20 is shared among the first relay server A, the second relay server B, and the third relay server C, and is stored into the relay group information storage unit 141 of the relay servers. In addition, the relay group information 20 is shared between the relay server and the client terminal, and is stored into the relay group information storage unit 241 of the client terminals.

Figure 6:
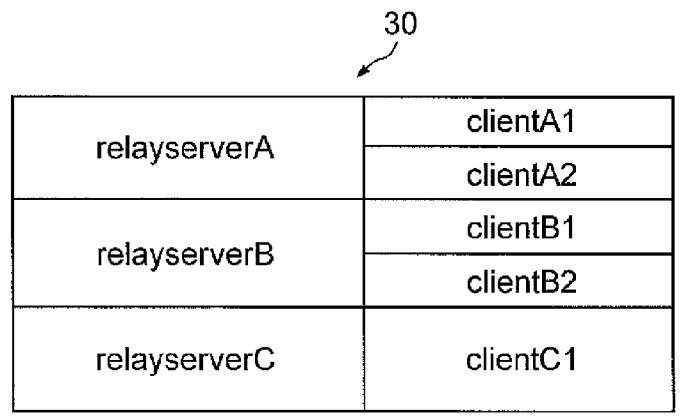
FIG. 6 is a view showing a schematic configuration of relay server information according to a preferred embodiment of the present invention.

FIG. 6 shows a schematic configuration of the relay server information 30 in accordance with a preferred embodiment of the present invention. The relay server information 30 is information showing a summary of the relay servers and the client terminals defining the relay communication system, and is stored into the relay server information storage unit 142 of the relay servers and the relay server information storage unit 242 of the client terminals.

As shown in FIG. 6, the first client terminal A1 and the second client terminal A2 are connected to the first relay server A. The third client terminal B1 and the fourth client terminal B2 are connected to the second relay server B. The fifth client terminal C1 is connected to the third relay server C.

FIG. 7 shows a detailed configuration of the relay server information 30. The relay server information 30 preferably includes upper information 301-1, 301-2, 301-3, and lower information 302-1, 302-2, 302-3.

The upper information 301-1, 301-2, 301-3 is information on the relay servers. "site id" indicates identification information of the relay server. "name" indicates name of the relay server. "stat" indicates information on whether or not the relay server is activated.

The lower information 302-1, 302-2, 302-3 is information on the client terminal. "div" indicates name of division of the client terminal. "group" indicates identification information of the relay server to which the client terminal belongs. "id" indicates identification information of the client terminal. "name" indicates name of the client terminal. "site" indicates identification information of the relay server to which the client terminal logs in when the client terminal logs in.

The relay server information 30 is preferably shared among the first relay server A, the second relay server B, and the third relay server C, and is stored into the relay server information storage unit 142 of the relay servers. In addition, the relay server information 30 is shared among the relay servers and the client terminals, and is stored into the relay server information storage unit 242 of the client terminals.

When the relay server is being activated, "stat" of the upper information 301-1, 301-2, 301-3 is "active". When the relay server is not being activated, "stat" is blank. Accordingly, the information on whether or not the relay server is being activated is shared in the whole relay communication system.

When the client terminal is being logging onto the relay server, identification information of the relay server into which the client terminal logs onto is shown in "site" of the lower information 302-1, 302-2, 302-3. When the client terminal is not logging onto the relay server, "site" is blank. Accordingly, information on whether or not the client terminal is logging onto the relay server is shared in the whole relay communication system.

FIG. 8, FIG. 9, and FIG. 10 respectively show client terminal information 40, 50, 60 as specific examples of the client terminal information in accordance with a preferred embodiment of the present invention. The client terminal information is information on details of the client terminal defining the relay communication system, and is stored in the client terminal information storage unit 143 of the relay servers and the client terminal information storage unit 243 of the client terminals.

"addr" is address information of the client terminal, and indicates IP address of the client terminal, specifically. "div" indicates name of division of the client terminal. "expr" is expiration period information of the client terminal, and indicates registration expiration period of the client terminal, specifically. "group" indicates identification information of the relay group to which the client terminal belongs. "id" indicates identification information of the client terminal. "name" indicates name of the client terminal. "pass" indicates password of the client terminal. "port" is client terminal port information, and indicates port number of the client terminal, specifically.

The client terminal information 40, 50, and 60 are shared with the relay servers and the client terminals in the relay group, and are stored into the client terminal information storage unit 143 of the relay servers and into the client terminal information storage unit 243 of the client terminals.

VLAN group information is information including information of VLAN client terminals defining the VLAN group, information of the relay servers to which the VLAN client terminals are connected, and the session information among the relay servers.

FIG. 11 shows a detailed configuration of the VLAN group information 70 in accordance with a preferred embodiment of the present invention. The VLAN group information 70 preferably includes group information 71, VLAN client terminal information 72, and session information 73.

The group information 71 is information about the VLAN group. In the group information 71, "group" is identification information of the relay group defining the VLAN group. "id" indicates identification information of the VLAN group. "lastmod" indicates latest update time of the VLAN group information. "name" indicates name of the VLAN group.

The VLAN client terminal information 72 is information related to VLAN client terminals defining the VLAN group. "dev id" indicates identification information of the VLAN client terminals. In this example, the first client terminal A1, the third client terminal B1, the fourth client terminal B2, and the fifth client terminal C1 are the VLAN client terminals.

The session information 73 includes hub information and routing information. The hub information is identification information of the relay server to which the VLAN client terminal is connected. The routing information is information that defines communication paths among the relay servers, and includes "sp" and "sp" is a start point of the connection path, and a relay server indicated by the "sp" is on a connecting-side of the relay server. "ep" is an end point of the connection path, and a relay server indicated by the "ep" is on a connected-side of the connection path.

In this example, the hub information includes identification information of the first relay server A, the second relay server B, and the third relay server. As the routing information, a session is defined in which the start point is the first relay server A and the end point is the second relay server B. In addition, a session is defined in which the start point is the first relay server A and the end point is the third relay server C, and a session is defined in which the start point is the second relay server B and the endpoint is the third relay server C. Accordingly, in the session information 73, since the start point and the end point of the communication path among the relay servers are defined, the communication paths among the relay servers are prevented from overlapping each other.

The VLAN group information 70 is preferably shared between and VLAN client terminals and the relay servers to which the VLAN client terminal is connected, and is stored into the VLAN group information storage unit 244 of the VLAN client terminals and the VLAN group information storage unit 144 of the relay servers. On the other hand, the VLAN group information 70 may be shared only among the VLAN client terminals.

In this preferred embodiment below, an example will be described in which the VLAN group information 70 is shared among the VLAN client terminals, and is stored into the VLAN group information storage unit 244 of the VLAN client terminals. The processes of creating and sharing the VLAN group information 70 will be described later in detail.

The virtual address information is preferably information including identification information of the VLAN device that is activatable as a client terminal of the VLAN group, a virtual IP address and a virtual MAC address. The virtual address information is stored in the virtual address information storage unit 245 of the VLAN device. In addition, the virtual address information may be stored in the virtual address information storage unit 145 of the relay server.

Figure 12:
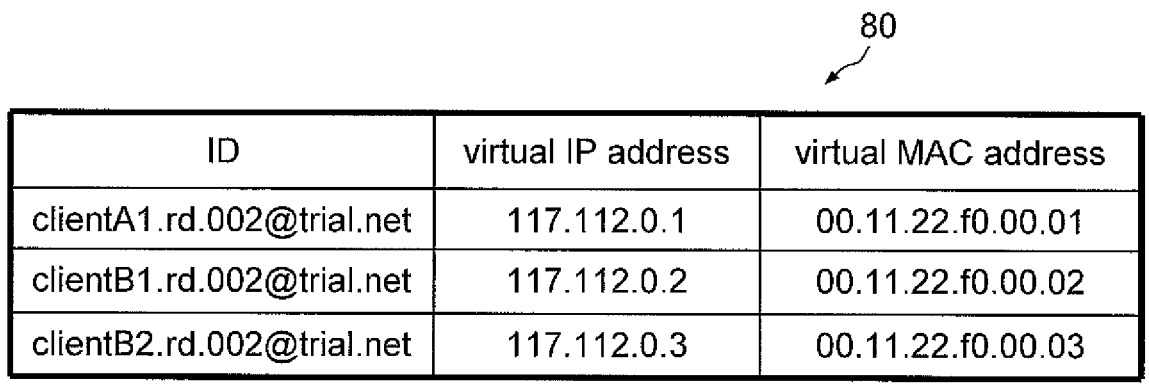
FIG. 12 is a view showing a detailed configuration of virtual address information according to a preferred embodiment of the present invention.

FIG. 12 shows a detailed configuration of the virtual address information 80 in accordance with a preferred embodiment of the present invention. The virtual address information 80 is associated with the identification information, the virtual IP address, and the virtual MAC address of the VLAN device. The virtual IP address and the virtual MAC address are preferably given such that they do not overlap the IP address and MAC address the VLAN devices actually use. In addition, the virtual IP address and virtual MAC address are given such that they do not overlap each other in the VLAN group.

In the virtual address information 80 of this example, the identification information, the virtual IP address and the virtual MAC address are associated with the first client terminal A1, the third client terminal B1, the fourth client terminal B2, and the fifth client terminal C1, as the VLAN devices.

As described later, since the virtual address information 80 is shared among the VLAN devices, the client terminal belonging to different LANs can communicate with each other as the VLAN devices. The processes of creating and sharing the virtual address information 80 will be described later in detail.

Figure 13:
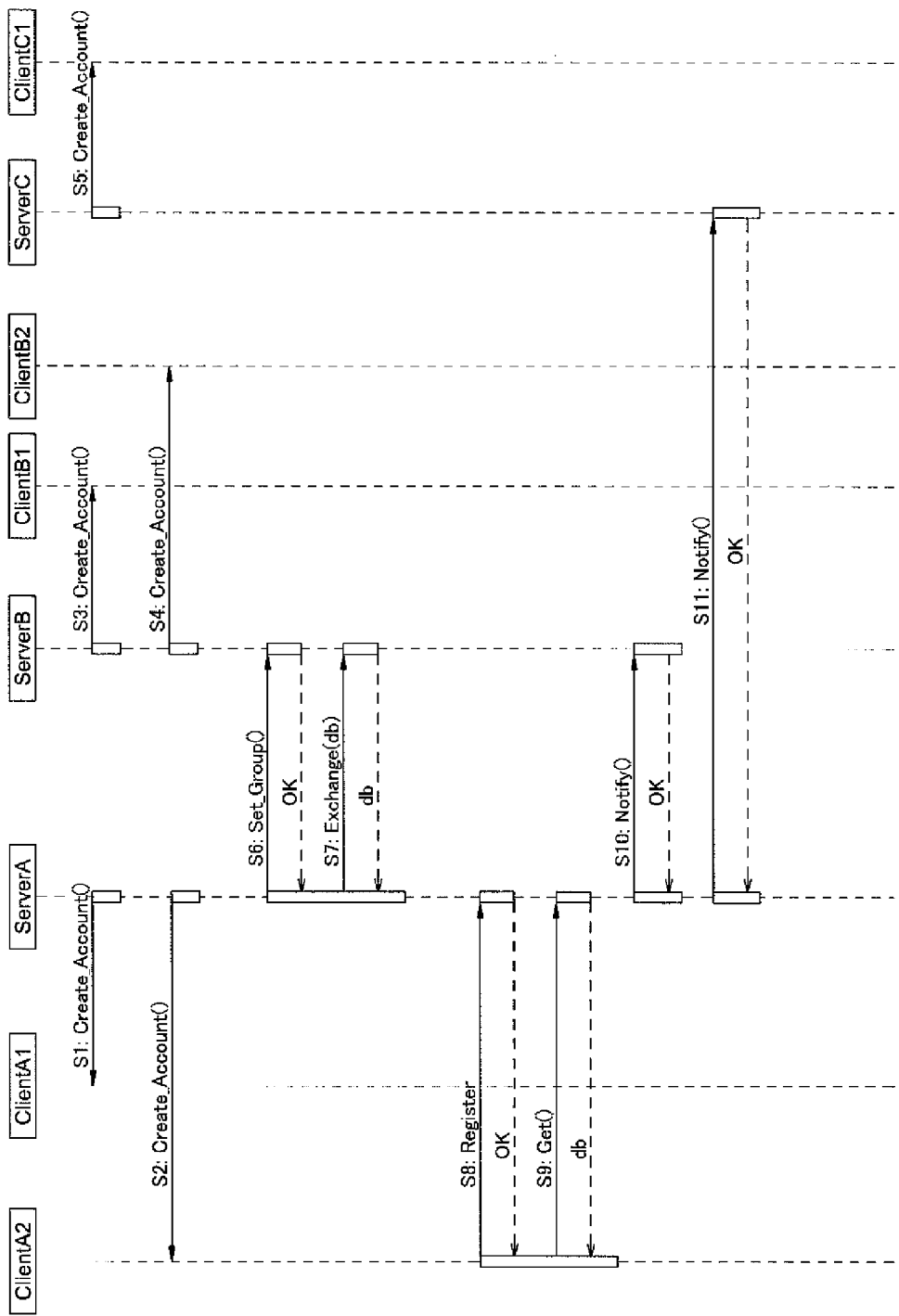
FIG. 13 is a view showing a process flow related to a construction of a relay group according to a preferred embodiment of the present invention.

Using a sequence diagram of FIG. 13, the initialization of the first relay group will be described. Specifically, FIG. 13 shows a flow of processes creating the relay group information, the relay server information, and the client terminal information in accordance with a preferred embodiment of the present invention.

The administrator of the first relay server A creates accounts for users of the first client terminal A1 and the second client terminal A2 (step S1, step S2: Create_Account ( )). The administrator of the second relay server B creates accounts for users of the third client terminal B1 and the fourth client terminal B2 (step S3, step S4: Create_Account ( )). The administrator of the third relay server C creates an account for a user of the fifth client terminal C1 (step S5: Create_Account ( )).

In the above-described processes, the first relay server A creates and stores the relay server information therein. The second relay server B creates and stores the relay server information therein. The third relay server C creates and stores the relay server information therein. The first relay server A creates and stores the client terminal information therein, the second relay server B creates and stores the client terminal information therein, and the third relay server C creates and stores the client terminal information therein.

FIG. 14, FIG. 15, and FIG. 16 respectively show relay server information 31-1, relay server information 31-2, and relay server information 31-3 in accordance with a preferred embodiment of the present invention. The relay server information 31-1 is preferably information the first relay server A creates and stores. The relay server information 31-2 is preferably information that the second relay server B creates and stores. The relay server information 31-3 is preferably information the third relay server C creates and stores.

FIG. 14 shows relay server information 31-1. The upper information 311-1 is preferably information related to the first relay server A. As "site id", "serverA@trial.net" is set. As "name", "Server A" is set. As "stat", "active" is set.

The lower information 312-1 is information related to the first client terminal A1 and the second client terminal A2.

The information related to the first client terminal A1 will be described as follows. As "div", "dev" is set. As "group", "1279671471393.clientA1.rd.002@trial.net" is set. As "id", "clientA1.rd.002@ServerA.trial.net" is set. As "name", "clientA1" is set. It should be noted that although "serverA.trial.net" is set as "site" in FIG. 14, meaning that a user of the first client terminal A1 is logging onto the first relay server A, "site" is, in fact, blank in steps S1 to S5 in FIG. 13

The information related to the second client terminal A2 will be described as follows. As "div", "dev" is set. As "group" "1279671471393.clientA1.rd.002@trial.net" is set. As "id", "clientA2.rd.002@ serverA.trial.net" is set. As "name", "clientA2" is set. It should be noted that denotation of the "site" is similar to a case of the first client terminal A1.

The contents of the relay server information 31-2 and the relay server information 31-3, including upper information 311-2, upper information 311-3, lower information 312-2, and lower information 312-3, are preferably similar to the content of the relay server information 31-1, so the explanation thereof will be omitted.

The flow of processes related to creating the relay group information, the relay server information, and the client terminal information will be described, with reference again to FIG. 13. In FIG. 13, the first relay server A requests the second relay server B to send the construction group of the relay communication system (step S6: Set_Group ( )). The first relay server A and the second relay server B create the relay group information and store it therein. Next, the first relay server A requests the second relay server B to exchange the relay server information (step S7: Exchange (db)). Accordingly, the first relay server A transmits the relay server information to the second relay server, and the second relay server B transmits the relay server information to the first relay server A. The first relay server A and the second relay server B synthesize the relay server information to make new relay server information, and then store it therein. It should be noted that the processes similar to step S6 and step S7 are executed between the first relay server A and the third relay server C, and are executed between the second relay server B and the third relay server C. As a result, the common relay server information is shared among the first relay server A, the second relay server B, and the third relay server C.

A user of the second client terminal A2 inputs identification information of the second client terminal A2 and the password for logging onto the first relay server A (step S8: Register). The first relay server A refers to the client terminal information, and then authenticates the user of the second client terminal A2. The first relay server A updates the client terminal information.

Then, the second client terminal A2 requests the first relay server A to transmit the relay group information and the relay server information (step S9: Get ( )). The first relay server A transmits the relay group information and the relay server information to the second client terminal A2. The second client terminal A2 stores the relay group information and the relay server information therein.

The first relay server A refers to the relay server information, and determines that it should notify the second relay server B that the relay server information has been updated if it confirms "site" related to the second relay server B has become "active". Then, the first relay server A notifies the second relay server B that the relay server information has been updated (step S10: Notify ( )). The second relay server B updates the relay server information, and stores it therein. It should be noted that the first relay server A notifies the third relay server C as well that the relay server information has been updated (step S11: Notify ( )).

If the users of the first client terminal A1, the third client terminal B1, the fourth client terminal B2, or the fifth client terminal C1 log onto the relay server, the relay server information of the relay server is updated similarly. In addition, similarly, if the user of the client terminals logs off, the relay server information in the relay server is updated.

Also, the update of the relay server information is notified to the client terminals that are logging on.

Figure 17:
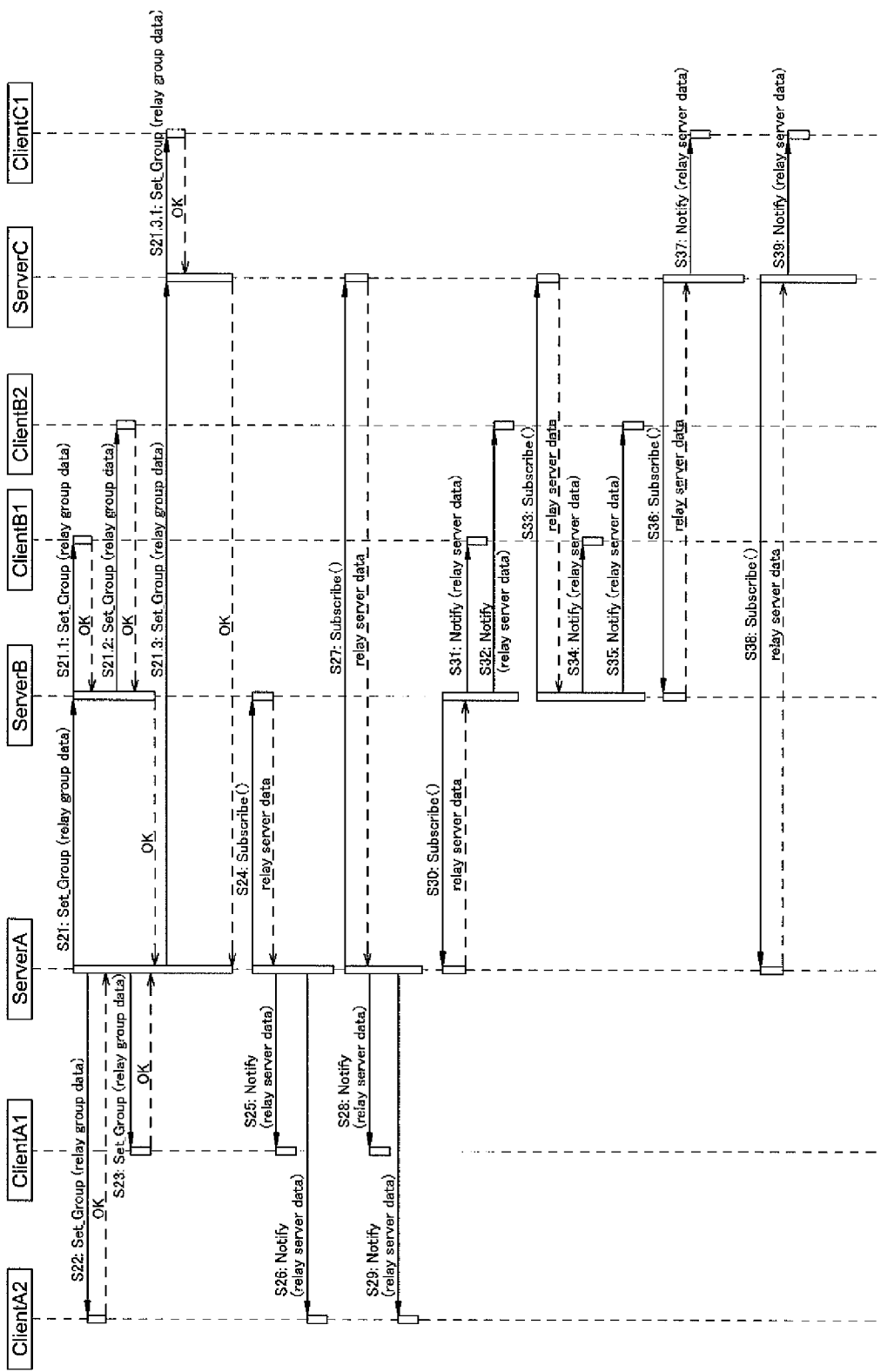
FIG. 17 is a view showing a flow process related to the sharing relay group information and relay server information according to a preferred embodiment of the present invention.

The share process when the information of the relay group is changed will be described with reference to FIG. 17. FIG. 17 is a view showing a flow of process related to the sharing of the relay group information and the relay server information in accordance with a preferred embodiment of the present invention.

In FIG. 17, if the first relay group is changed, the first relay server A transmits the changed relay group information to the second relay server B, for example (step S21: Set_Group (relay group information)). Then, the second relay server B transmits the relay group information to the third client terminal B1 and the fourth client terminal B2 (step S21.1 and step S21.2: Set_Group (relay group information)). If the OKs return from the third client terminal B1 and the fourth client terminal B2, the second relay server B returns OK to the first relay server A.

Furthermore, the first relay server A transmits the changed relay group information to the second client terminal A2 (step S22: Set_Group (relay group information)). The second client terminal A2 returns OK to the first relay server A. The first relay server A transmits the changed relay group information to the first client terminal A1 (step S23: Set_Group (relay group information)). The first client terminal A1 returns OK to the first relay server A.

The first relay server A transmits the changed relay group information to the third relay server C (step S21.3: Set_Group (relay group information)). Then, the third relay server C transmits the relay group information to the fifth client terminal C1 (step S21.3.1: Set_Group (relay group information)). If OK returns from the fifth client terminal C1, the third relay server C returns OK to the first relay server A.

According to the above-described processes, the whole of the relay servers and the client terminals share the relay group information.

The sharing of the relay server information will be described with reference again to FIG. 17. In this example, the process for sharing preferably uses a framework of event notification. In the event notification, a subscriber is an agent who requests state notification of a resource, a notifier is an agent who notifies status of the resource. If the status of the resource is changed during the subscription period, the notifier notifies the subscriber of the change.

The first relay server A subscribes the relay server information to the second relay server B (step S24: Subscribe ( )). If the status indicated by the relay server information has been changed, the second relay server B updates the relay server information held by the second relay server B. Then, the second relay server B transmits the updated relay server information to the first relay server A. The first relay server A updates the relay server information using the relay server information transmitted from the second relay server B. The first relay server A notifies the first client terminal A1 that the relay server information has been updated (step S25: Notify (relay server information)), and then notifies the second client terminal A2 (step S26: Notify (relay server information)).

Next, the first relay server A subscribes the relay server information to the third relay server C (step S27: Subscribe ( )). If the status indicated by the relay server information has been changed, the third relay server C updates the relay server information held by the third relay server C. Then, the third relay server C transmits the updated relay server information to the first relay server A. The first relay server A updates the relay server information using the relay server information transmitted from the third relay server C. The first relay server A notifies the first client terminal A1 that the relay server information has been updated (step S28: Notify (relay server information)), and notifies the second client terminal A2 (step S29: Notify (relay server information)).

The second relay server B subscribes the relay server information to the first relay server A (step S30: Subscribe ( )). If the status indicated by the relay server information has been changed, the first relay server A updates the relay server information held by the first relay server A. Then, the first relay server A transmits the updated relay server information to the second relay server B. The second relay server B updates the relay server information using the relay server information transmitted from the first relay server A. The second relay server B notifies the third client terminal B1 that the relay server information has been updated (step S31: Notify (relay server information)), and then notifies the fourth client terminal B2 (step S32: Notify (relay server information)).

The second relay server B subscribes the relay server information to the third relay server C (step S33: Subscribe ( )). If the status indicated by the relay server information is changed, the third relay server C updates the relay server information held by the third relay server C. Then, the third relay server C transmits the updated relay server information to the second relay server B. The second relay server B updates the relay server information using the relay server information transmitted from the third relay server C. The second relay server B notifies the third client terminal B1 that the relay server information has been updated (step S34: Notify (relay server information)), and then notifies the fourth client terminal B2 (step S35: Notify (relay server information)).

The third relay server C subscribes the relay server information to the second relay server B (step S36: Subscribe ( )). If the status indicated by the relay server information is changed, the second relay server B updates the relay server information held by the second relay server B. Then, the second relay server B transmits the updated relay server information to the third relay server C. The third relay server C updates the relay server information using the relay server information transmitted from the second relay server B. The third relay server C notifies the fifth client terminal C1 that the relay server information has been updated (step S37: Notify (relay server information)).

The third relay server C subscribes the relay server information to the first relay server A (step S38: Subscribe ( )). If the status indicated by relay server information is changed, the first relay server A updates the relay server information held by the first relay server A. Then, the first relay server A transmits the updated relay server information to the third relay server C. The third relay server C updates the relay server information using the relay server information transmitted from the first relay server A. The third relay server C notifies the fifth client terminal C1 that the relay server information has been updated (step S39: Notify (relay server information)).

According to the above-described processes, the first relay server A, the second relay server B, and the third relay server C preferably share the relay server information instantly when the relay server information is updated. Accordingly, the first relay server A, the second relay server B, and the third relay server C can preferably always know activation states of the other relay servers, and kinds and log-on status of the client terminals connected to relay servers.

In the relay communication system according to a preferred embodiment of the present invention, if the number and the connection states of the LANs and the client terminals are changed, one relay server instantly updates the relay group information, the relay server information, and the client terminal information depending on its content when recognizing the changes in state.

Then, one relay server instantly notifies other relay servers recited in the relay group information and the relay server information that the relay group information and the relay server information have been updated. In addition, one relay server instantly notifies the client terminals recited in the client terminal information that the relay group information, and the relay server information, have been updated.

However, one relay server will not instantly notify the other relay servers when it is determined that the other relay server is an unconnected state even if the other relay server is recited in the relay group information and the relay server information. In addition, one relay server will not instantly notify the client terminals when it is determined that the client terminals are in an unconnected state even if the client terminal is recited in the client terminal information.

Accordingly, information on changes in the number and the connection states of the LANs and the client terminals is preferably shared in the whole relay communication system in real time or substantially in real time.

After the information on the changes in the number and the connection states of the LANs and the client terminals in the relay communication system is shared, assume that a user using the client terminal appoints another client terminal for communication. In this case, the data is transmitted and received as follows.

Specifically, the client terminal transmits a communication packet including the client terminal information of the client information of the specified destination and data to be transmitted, to a relay server to which the client terminal is connected. The relay server, which has received the communication packet, refers to the relay server information, and confirms under which relay server in the relay group the appointed client terminal exists. In addition, the relay server confirms whether or not the relay server with the client terminals under the control thereof is in an activated state, and confirms whether or not the appointed client terminal is in a log-on state. Specifically, it is possible to determine that the relay sever is in an activated state by confirming "stat" of the upper information of the relay server information is set to "active". It is also possible to determine that the client terminal is in a logging-on state by confirming that the lower information "site" of the relay server information recites identification information of the relay server to which the client terminal logs on.

If it is confirmed that the relay server is in the active state and the client terminal is in the logging-on state, the received communication packet is transmitted to the relay server with the appointed client terminal under the control thereof. In addition, the relay server, which has received communication packet, transmits the communication packet to the client terminal under the control of the relay server.

Figure 18:
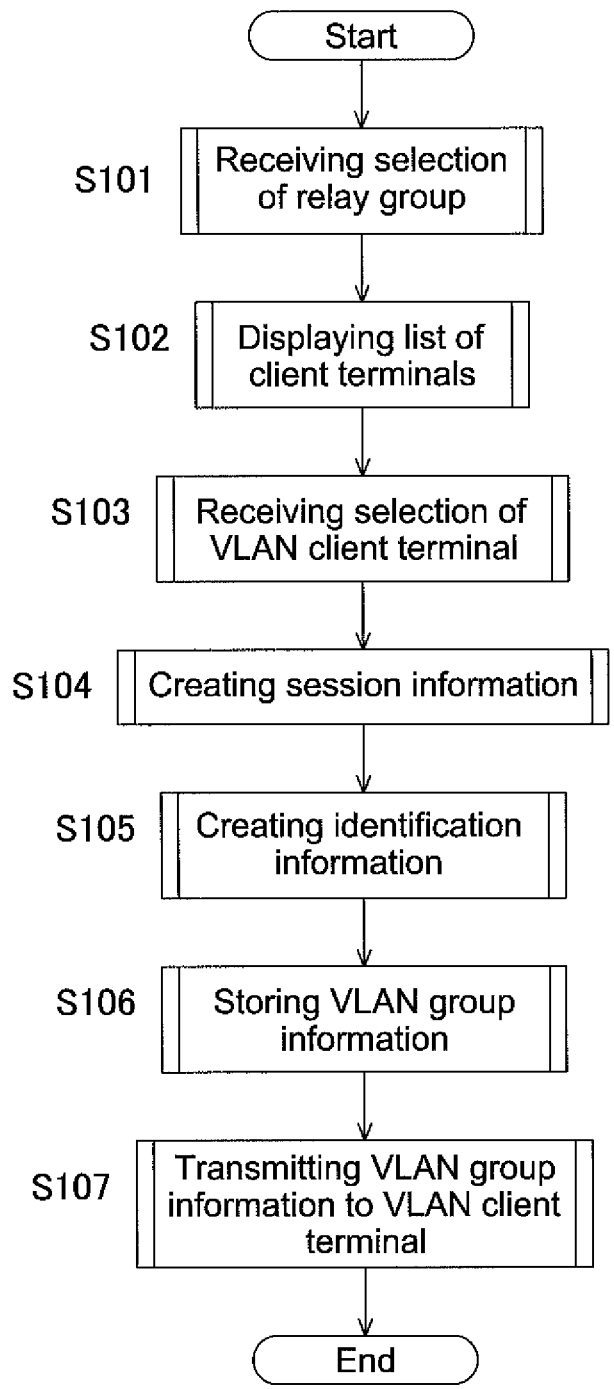
FIG. 18 is a flowchart showing a process that creates VLAN group information according to a preferred embodiment of the present invention.

Next, the creation and the sharing of the VLAN group information will be described with reference to FIG. 18. FIG. 18 is a flowchart showing a process of creating the VLAN group information in accordance with a preferred embodiment of the present invention. In a following example, while the information on the changes in the number and the connection states of the LANs and the client terminals are shared in the first relay group (refer to FIG. 17), the first client terminal A1 creates the VLAN group information. In addition, in this example, the first client terminal A1, the third client terminal B1, the fourth client terminal B2, and the fifth client terminal C1 in the first relay group are selected as the VLAN client terminals.

First, the VLAN group information creating section 232*a* of the VLAN group information control unit 232 in the first client terminal A1 receives selection of the relay group from a user (step S101). For example, the user selects a relay group by referring to the relay group information stored in the relay group information storage unit 241 with the display unit 224 and the operation input unit 225 of the first client terminal A1. In this example, the first relay group is selected as a relay group.

The VLAN group information creating section 232*a* extracts identification information of the first relay group by referring to the relay server information stored in the relay server information storage unit 242 when receiving the selection of the first relay group. It should be noted that the relay group information may be referred to instead of the relay server information.

When receiving the selection of the first relay group, the VLAN group information creating section 232*a* refers to the relay server information, and displays a list of the client terminals including the first relay group on the display unit 224 (step S102). After that, VLAN group information creating section 232*a* receives the selection of the VLAN client terminal from a user through the operation input unit 225 (step S103). At this time, the VLAN group information creating section 232*a* refers to the relay server information, and extracts identification information of the VLAN client terminal which has received the selection.

The VLAN group information creating section 232*a* creates session information after receiving the selection of the VLAN client terminal (step S104). Specifically, the VLAN group information creating section 232*a* determines a route configuration among the relay servers for establishing the hub session, and creates the session information.

For example, the VLAN group information creating section 232*a* determines that, the first relay server A is on a connecting-side, and the second relay server B is on a connected-side, regarding a session between the first relay server A and the second relay server B. Then, the VLAN group information creating section 232a inputs the identification number of the first relay server A into "sp", and inputs the identification number of the first relay server B into "ep". It should be noted that the session information created by the VLAN group information creating section 232a may be corrected by a user through the operation input unit 225 or the like.

After creating the session information, the VLAN group information creating section 232a creates identification information for identifying the VLAN group (step S105). After that, the VLAN group information creating section 232a stores the VLAN group information into VLAN group information storage unit 244, including the created identification information of the VLAN group, identification information of the VLAN client terminal, and the session information (step S106).

An example of the VLAN group information created in this process is VLAN group information 70 shown in FIG. 11. As described above, the VLAN group information 70 preferably includes the group information 71, the VLAN client terminal information 72, and the session information 73. Specifically, the group information 71 preferably includes "1279671471393.clientA1.rd.002@trial.net" as identification information of the first relay group. The group information 71 preferably includes "1279672104671.clientA1.rd.002@trial.net" as the VLAN group identification information and "vlangroup1" as name of the VLAN group. Below, the VLAN group indicated by the VLAN group information 70 will be called as a first VLAN group.

The VLAN client terminal information 72 shows identification information of the first client terminal A1, the third client terminal B1, the fourth client terminal B2, and the fifth client terminal C1, which have been selected by the user.

In addition, the session information 73 preferably includes session information in which "sp" is the first relay server A and "ep" is the second relay server B. The session information 73 includes session information in which "sp" is the first relay server A and "ep" is the third relay server C, and session information in which "sp" is the second relay server B and "ep" is the third relay server C.

The VLAN group information 70 is, after being created as described above, transmitted to the VLAN client terminal (step S107).

Figure 19:
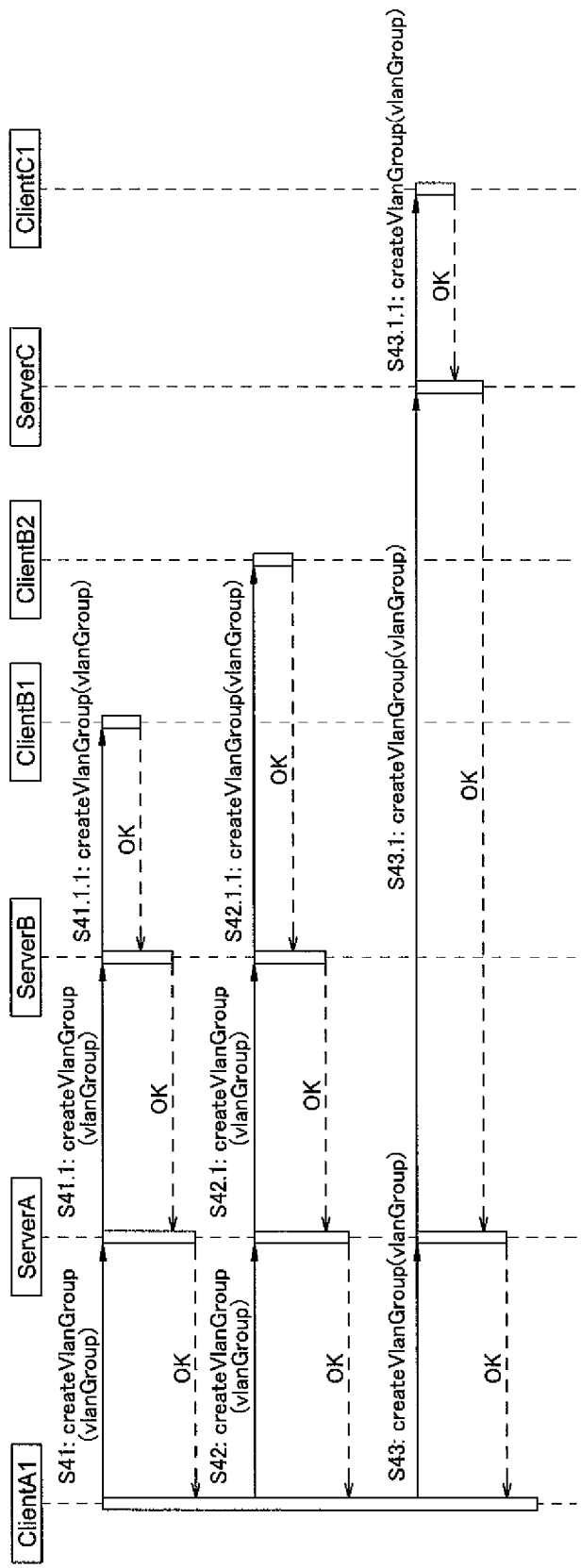
FIG. 19 is a view showing a flow process related to sharing VLAN group information according to a preferred embodiment of the present invention.

Next, with reference to the sequence diagram of FIG. 19, a process will be described in which the VLAN group information 70 is shared among VLAN client terminals. FIG. 19 is a view of showing a flow of process of sharing the VLAN group information in accordance with a preferred embodiment of the present invention. The process related to the sharing of the VLAN group information 70 is controlled by the VLAN group information control unit 132 of the relay servers and the VLAN group information control unit 232 of the client terminals.

The first client terminal A1, which has created the VLAN group information 70, transmits the VLAN group information 70 to the third client terminal B1 as a VLAN client terminal. Specifically, the first client terminal A1 first transmits the VLAN group information 70 to the first relay server A (step S41: createvlanGroup (vlanGroup)). The first relay server A transmits the received VLAN group information 70 to the second relay server B (step S41.1: createvlanGroup (vlanGroup)). The second relay server B transmits the VLAN group information 70 to the third client terminal B1 (step S41.1.1: createvlanGroup (vlanGroup)). After receiving the VLAN group information 70, the third client terminal B1 stores the received VLAN group information 70 into the VLAN group information storage unit 244, and returns OK to the second relay server B. In addition, the second relay server B returns OK to the first relay server A, and the first relay server A returns OK to the first client terminal A1.

Next, the first client terminal A1 transmits the VLAN group information 70 to the fourth client terminal B2 as a VLAN client terminal. Specifically, the first client terminal A1 transmits the VLAN group information 70 to the first relay server A (step S42: createvlanGroup (vlanGroup)). The first relay server A transmits the received VLAN group information 70 to the second relay server B (step S42.1: createvlanGroup (vlanGroup)). The second relay server B transmits the received VLAN group information 70 to the fourth client terminal B2 (step S42.1.1: createvlanGroup (vlanGroup)). After receiving the VLAN group information 70, the fourth client terminal B2 stores the received VLAN group information 70 into the VLAN group information storage unit 244, and returns OK to the second relay server B. In addition, the second relay server B returns OK to the first relay server A, and the first relay server A returns OK to the first client terminal A1.

Furthermore, the first client terminal A1 transmits the VLAN group information 70 to the fifth client terminal C1. Specifically, the first client terminal A1 transmits the VLAN group information 70 to the first relay server A (step S43: createvlanGroup (vlanGroup)). The first relay server A transmits the received VLAN group information 70 to the third relay server C (step S43.1: createvlanGroup (vlanGroup)). The third relay server C transmits the received VLAN group information to the fifth client terminal C1 (step S43.1.1: createvlanGroup (vlanGroup)). After receiving the VLAN group information 70, the fifth client terminal C1 stores the received VLAN group information 70 into the VLAN group information storage unit 244, and returns OK to the third relay server C. In addition, the third relay server C returns OK to the first relay server A, and the first relay server A returns OK to the first client terminal A1.

According to the above-described processes, all of the VLAN client terminals selected as client terminals defining the VLAN group share the VLAN group information 70. Accordingly, the preparation is performed for the VLAN session among the client terminals within the VLAN group.

It should be noted that, in the above-described process, the VLAN group information 70 may be shared among the relay servers to which the VLAN client terminals are connected as well as among the VLAN client terminals. In this case, when receiving the VLAN group information 70, the relay server preferably stores the VLAN group information 70 into the VLAN group information storage unit 144.

Figure 20A:
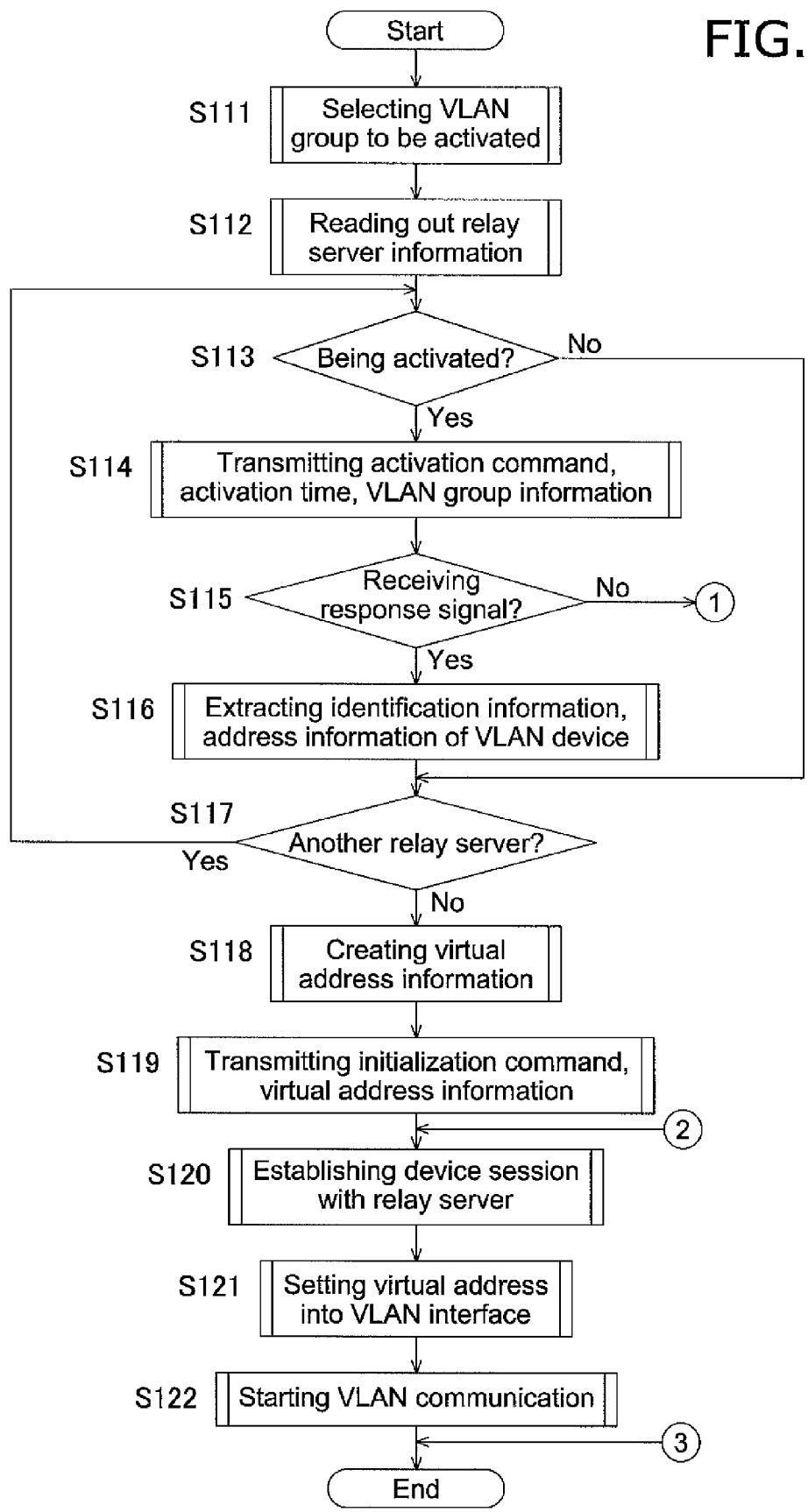
FIG. 20A is a first portion of a flowchart showing a process of establishing a VLAN session by a client terminal according to a preferred embodiment of the present invention.
Figure 20B:
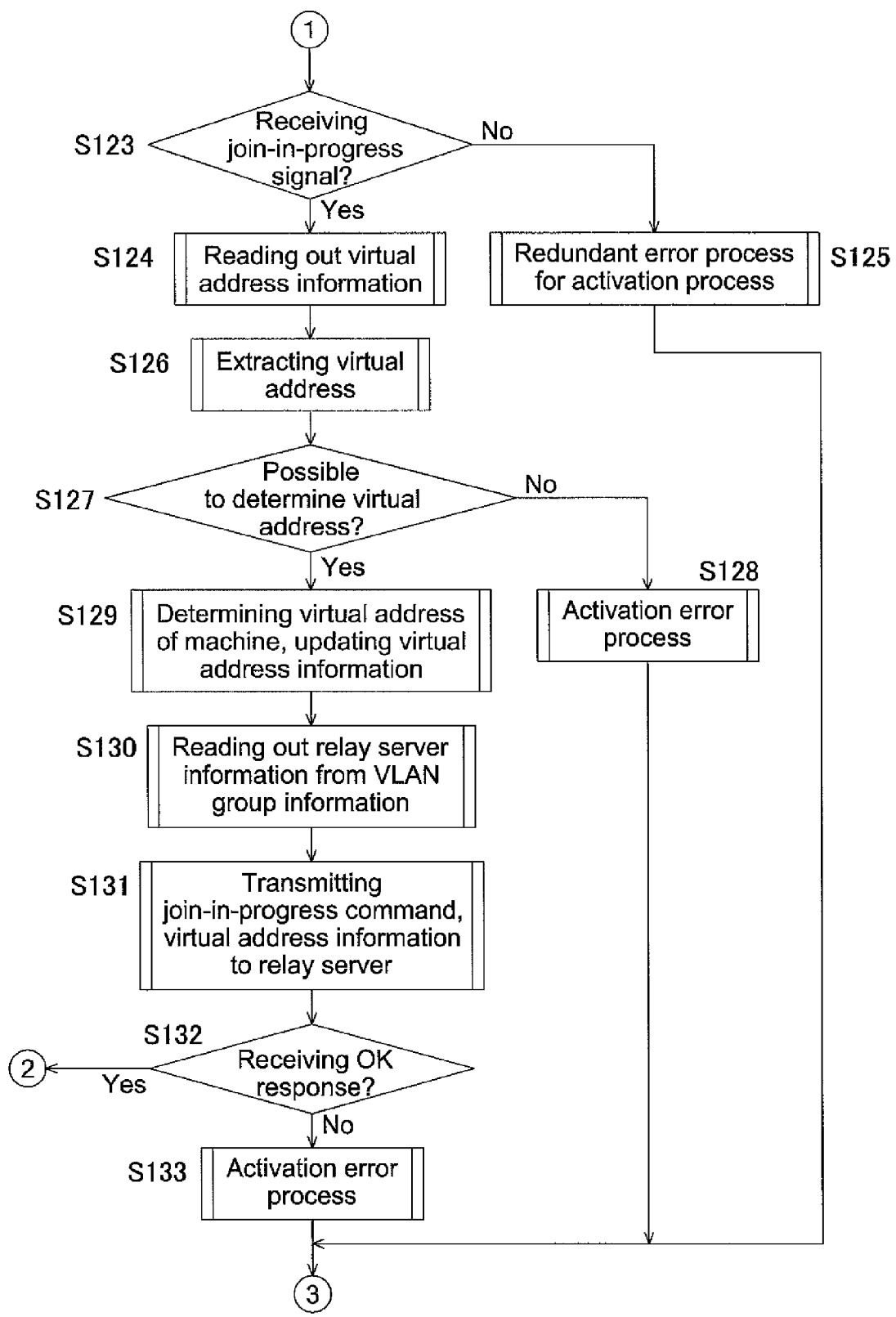
FIG. 20B is a second portion of the flowchart showing a process of establishing a VLAN session by a client terminal according to a preferred embodiment of the present invention.

In a relay communication system of a preferred embodiment of the present invention, a VLAN session is established in accordance with the VLAN group information 70 created and shared according to the above-described processes, so that the client terminals can communicate with each other as VLAN devices via a plurality of relay servers as a hub. Hereinafter, processes of establishing the VLAN session process and starting of the VLAN communication in a client terminal which receives activation instruction of the VLAN group information will be described with reference to FIG. 20A and FIG. 20B. FIG. 20A and FIG. 20B show a flowchart showing a process of establishing the VLAN session by the client terminal in accordance with a preferred embodiment of the present invention.

When a VLAN client terminal defining the VLAN group or a relay server to which the VLAN client terminal is connected receives an activation instruction of the VLAN group from a user, the process of establishing the VLAN session is started. In this example, the first client terminal A1 receives an activation instruction of the first VLAN groups indicated in the VLAN group information 70 from a user. In this case, the first client terminal A1, the third client terminal B1, and the fourth client terminal B2 are VLAN devices.

First, the activation command control unit 233 of the first client terminal A1 receives selection of the VLAN group to be activated (step S111). Specifically, the activation command control unit 233 displays on the display unit 224 a list of the VLAN group information stored in the VLAN group information storage unit 244, and receives a selection of the VLAN group to be activated via the operation input unit 225. In this example, the first VLAN group indicated by the VLAN group information 70 is selected.

After receiving the selection of the first VLAN group, the activation command control unit 233 reads out the information of the relay server from the VLAN group information 70 (step S112). Specifically, the activation command control unit 233 reads out identification information of a relay server which serves as a hub from the session information 73 of the VLAN group information 70. At this time, the activation command control unit 233 reads out the information via a filtering unit such that the identification information of the relay servers are not overlapped with each other. In this example, the activation command control unit 233 reads out the identification information of the first relay server A and the second relay server B.

Next, the activation command control unit 233 performs processes of step S113 through step S116. Specifically, the activation command control unit 233 refers to the relay server information stored in the relay server information storage unit 242, and determines whether or not a relay sever among the read-out relay servers is activated to which a VLAN client terminal other than the first client terminal A1 is connected (step S113). Then, the activation command control unit 233 performs a process of step S114 through step S116 on the activated relay servers. In this example, the processes of step S114 through step S116 are preferably performed on the second relay server B and the third relay server C, which relay servers to which the VLAN client terminals are connected except the first client terminal A1.

First, the activation command control unit 233 refers to the relay server information stored in the relay server information storage unit 242, and determines whether or not the second relay server B is activated. Specifically, the activation command control unit 233 confirms that the upper information "stat" of the relay server information is set as "active" in order to determine whether or not the second relay server B is activatable. If the second relay server B is activated, the activation command control unit 233 transmits activation information including the activation command, the activation time and the VLAN group information 70 to the second relay server B (step S114). The activation command is a command of notifying the activation of the VLAN group.

At this time, the second relay server B, after receiving the activation information, stores the VLAN group information 70 into the VLAN group information storage unit 144. On the other hand, according to the sharing process of the VLAN group information, if the VLAN group information 70 is shared not only among the VLAN client terminals but also between the second relay server B and the third relay server C, it is acceptable that the transmission of the VLAN group information 70 may be omitted, and only the identification information of the first VLAN group may be transmitted.

Next, the activation command control unit 233 receives a response signal from the second relay server B. Here, the response signal from the second relay server B includes the identification information, the IP address and the MAC address of the VLAN device among the VLAN client terminals connected to the second relay server B. The process of creating the response signal by the second relay server B will be described later.

The activation command control unit 233, after receiving the response signal from the second relay server B (Yes at step S115), extracts the identification information, the IP address, and the MAC address of the VLAN device from the received response signal (step S116).

After that, the activation command control unit 233 refers to the relay server information again, and determines whether or not there is another relay server by which the processes of step S113 through step S116 should be performed (step S117). If there is another relay server (Yes at step S117), the activation command control unit 233 performs processes of step S113 through step S116 on the other relay servers.

Hereinafter, at step S115, an example will be described in which a response signal is received from the second relay server B, which is connected to the third client terminal B1 and the fourth client terminal B2 as VLAN devices.

Figure 21:
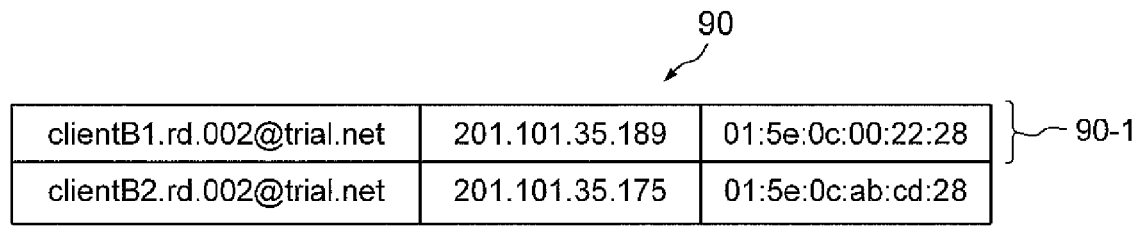
FIG. 21 is a view showing an example of the first extraction information related to IP address and MAC address of the VLAN device according to a preferred embodiment of the present invention.

FIG. 21 shows an example of the first extraction information related to the IP address and the MAC address of the VLAN device according to a preferred embodiment of the present invention. The first extraction information 90 preferably includes the identification information, the IP address and the MAC address of the VLAN device extracted from the response signal at step S116. The first extraction information 90-1 shown in FIG. 21 is the extraction information extracted from the response signal received from the second relay server B, and the first extraction information 90-2 is the extracted signal extracted from the response signal received from the third relay server C. The first extraction information 90-1 includes identification information, the IP address and the MAC address of the third client terminal B1, which are VLAN devices connected to the second relay server B. The first extraction information 90-2 includes the identification information, the IP address and the MAC address of the third client terminal B1 and the fourth client terminal B2, which are VLAN devices connected to the second relay server B.

If it is determined that the relay server is not activated (No at step S113), a process proceeds to step S117.

If it is determined that the other relay server exists (No at step S117), then the virtual address creating unit 234a of the virtual address control unit 234 creates the virtual address information (step S118). The virtual address information includes virtual IP address and virtual MAC address to be given to the VLAN devices.

Figure 22:
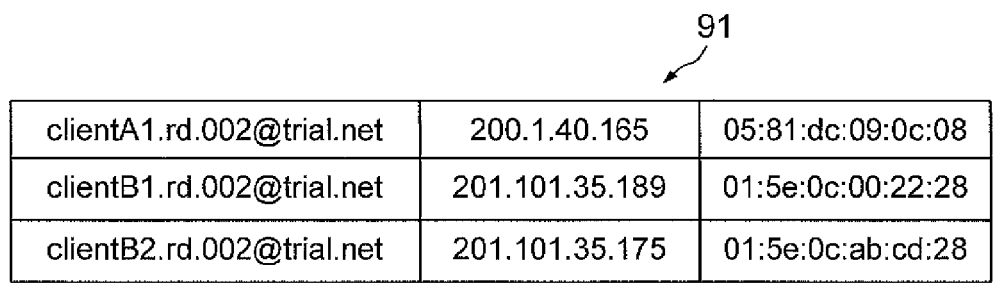
FIG. 22 is a view showing an example of the second extraction information produced by adding IP address and MAC address of the first client terminal to the first extraction information according to a preferred embodiment of the present invention.

A process of creating the virtual address will be described with reference to FIG. 12, FIG. 21 and FIG. 22. FIG. 22 shows an example of the second extraction information, which is created by adding the IP address and the MAC address of the first client terminal A1 to the first extraction information in FIG. 21 in accordance with a preferred embodiment of the present invention.

The virtual address creating unit 234a preferably first adds the identification information, the IP address and MAC address of the first client terminal A1 to the first extraction information 90. Then, the virtual address creating unit 234a creates the second extraction information 91 that includes all of information of the first client terminal A1 and the VLAN devices extracted at step S116. As shown in FIG. 22, in the second extraction information 91, the identification information, the IP address and the MAC address of the first client terminal A1, the third client terminal B1, and the fourth client terminal B2 are combined in one table.

Next, the virtual address creating unit 234*a* creates virtual address information, based on the IP address and MAC address indicated by the second extraction information 91. Specifically, the virtual address creating unit 234*a* assigns IP address that is not overlapped with IP address indicated by the second extraction information 91 to the VLAN devices, as virtual IP addresses. In addition, the virtual address creating unit 234*a* assigns MAC address that is not overlapped with the MAC address indicated by the second extraction information 91 to the VLAN devices, as a virtual MAC address. In addition, the virtual address creating unit 234*a* assigns the virtual IP address and the virtual MAC address to the VLAN devices such that the virtual IP address and the virtual MAC address are not overlapped with each other among the VLAN devices. In this example, different numbers are given to the end of the virtual IP address and the virtual MAC address in order not to overlap the virtual addresses among the VLAN devices.

The virtual address information created according to the above-described process is virtual address information 80 shown in FIG. 12. In this example, virtual IP address "117.112.0.1", and virtual MAC address "00.11.22:f0.00.01" are preferably assigned to the first client terminal A1, which is identified by identification information "clientA1.rd.002@trial.net". In addition, virtual IP address "117.112.0.2", and virtual MAC address "00.11.22:f0.00.02" are preferably assigned to the third client terminal B1, which is identified by identification information "clientB1.rd.002@trial.net". Virtual IP address "117.112.0.3" and virtual MAC address "00.11.22:f0.00.03" are preferably assigned to the fourth client terminal B2, which is identified by identification information "clientB2.rd.002@trial.net".

Next, the virtual address control unit 234 transmits the created virtual address information 80 with the initialization command to a relay server defining a hub (step S119). The initialization command is a command related to initialization of the VLAN interface, and preferably includes "1279672104671.clientA1.rd.002@trial.net" as identification information of the first VLAN group. In this example, the virtual address control unit 234 transmits the created virtual address information 80 and the initialization command to the first relay server A, the second relay server B, and the third relay server C. At this time, the first relay server A, the second relay server B, and the third relay server C, which have received the virtual address information 80 and the initialization command, refer to the session information 73 of the VLAN group information 70, and establish a hub session among the relay servers. The establishment of the hub session among the relay servers will be described later in detail.

After that, the VLAN session control unit 237 preferably performs a process of establishing a device session with the first relay server A (step S120). In detail, OK is returned corresponding to the request of establishing the device session from the first relay server A, allowing the device session to serve as a VLAN session. At this time, a device session is established between the second relay server B and the third client terminal B1 as well as the fourth client terminal B2. A device session is also established between the third relay server C and the fifth client terminal C1.

As described above, in the VLAN group, when the VLAN session is established including the hub session and the device session, the VLAN session control unit 237 initializes the VLAN interface 221B of the first client terminal A1, and sets the virtual address for the VLAN interface 221B. Specifically, the VLAN session control unit 237 sets the virtual IP address and the virtual MAC address of the virtual address information 80 into the VLAN interface 221B of the first client terminal A1 (step S121). At this time, the third client terminal B1 and the fifth client terminal C1 also preferably set the virtual IP address and virtual MAC address of the virtual address information 80 into the VLAN interfaces of them (step S121).

When the virtual address is set in the VLAN devices according to the above-described process using the virtual address and the VLAN session, the client terminals can communicate with each other as VLAN devices (step S122).

In the above-described example, when the first client terminal A1 is to transmit the activation information upon receiving the selection of the activation of the first VLAN group, the first VLAN group may have been activated in accordance with the activation instruction from the other client terminal or the relay server. In this case, in order to address the overlapped activation of the VLAN groups, the following process is performed.

If the first VLAN group has already been activated, a response signal (refer to step S114) is not transmitted in response to the transmission of the activation information from the second relay server B and/or the third relay server C. Accordingly, the activation command control unit 233 does not receive the response signal (No at step S115), and determines whether or not it has received join-in-progress signal from the second relay server B and/or the third relay server C (step S123). The join-in-progress signal is a signal which permits the first client terminal A1 to join in-progress with the first VLAN group. The join-in-progress signal preferably includes the virtual address information, which has already been created by the previous activation of the first VLAN group.

Whether or not the first client terminal A1 is arranged to join in-progress with the first VLAN group is determined by any of the relay servers, to which the VLAN client terminal is connected and which has been activated. For example, if the second relay server B determines the join-in-progress, the second relay server B transmits the join-in-progress signal to the first client terminal A1 via the first relay server A. The transmission of the join-in-progress signal by the relay server will be described later in detail.

If the join-in-progress signal is not received from the second relay server B (No at step S123), the activation command control unit 233 executes a process of overlap error of the activation process to finish the activation process (step S125).

On the other hand, if the join-in-progress signal is received, then, the virtual address control unit 234 reads out virtual address information that has been received together with the join-in-progress signal (step S124), and extracts the virtual IP address and the virtual MAC address assigned to the VLAN devices, from the virtual address information (step S126).

Next, the virtual address control unit 234 refers to the extracted virtual IP address and virtual MAC address, and determines whether or not the virtual address can be determined for the first client terminal A1 (step S127). Specifically, the virtual address control unit 234 preferably determines whether or not the IP address which the first client terminal A1 is currently using belongs to the same address system as that of the extracted virtual IP address. Furthermore, the virtual address control unit 234 determines whether or not the MAC address which the first client terminal A1 is currently using belongs to the same address system as that of the extracted virtual MAC address. If the address segment of the first client terminal A1 is the same as that of the virtual address, the virtual address control unit 234 finishes the process because it determines that the activation error happens (step S128).

On the other hand, if IP address and MAC address of the first client terminal A1 and the virtual IP address and the virtual MAC address belong to different address systems, the virtual address control unit 234 determines the virtual address for the first client terminal A1, and updates the virtual address information (step S129). For example, the virtual address control unit 234 preferably assigns the virtual IP address and the virtual MAC address formed by changing the ends of the extracted virtual IP address and the virtual MAC address, to the first client terminal A1. Then, the virtual address control unit 234 updates the virtual address information by adding the assigned virtual IP address and virtual MAC address as well as the identification information of the first client terminal A1 to the virtual address information (step S130).

After updating the virtual address information, the virtual address control unit 234 transmits the updated virtual address information and join-in-progress command to the first relay server A (step S131). The join-in-progress command is a command showing the join-in-progress to the VLAN, and includes the identification information of the VLAN group.

If receiving an OK response from the first relay server A (Yes at step S132), a process proceeds to step S120, and the VLAN session control unit 237 performs a process of establishing a device session with the first relay server A. On the other hand, if no OK response is received from the first relay server A (No at step S132), the virtual address control unit 234 determines that the activation error happens and finishes the process (step S133).

The updated virtual address information and join-in-progress command are transmitted to the VLAN devices via the relay servers after that.

The execution of the above-described process is preferably used to address the overlapping of the activation of the first VLAN group. Furthermore, even if the activation instructions of the first VLAN group are overlapped with each other, the client terminal which has transmitted the activation instruction later is arranged to join in-progress with the first VLAN group if the address which the client terminal uses and the virtual address previously created by the activation of the first VLAN group do not belong to the same address system.

Next, a process of establishing the VLAN session process and starting of the VLAN communication in the relay server which has received the activation information from a client terminal which has accepted the activation instruction of the VLAN group, will be described. In this example, a process by the second relay server B will be described, which has received the activation information including the activation command, the activation time and the VLAN group information 70 from the first client terminal A1 (refer to step S114 in FIG. 20).

Figure 23A:
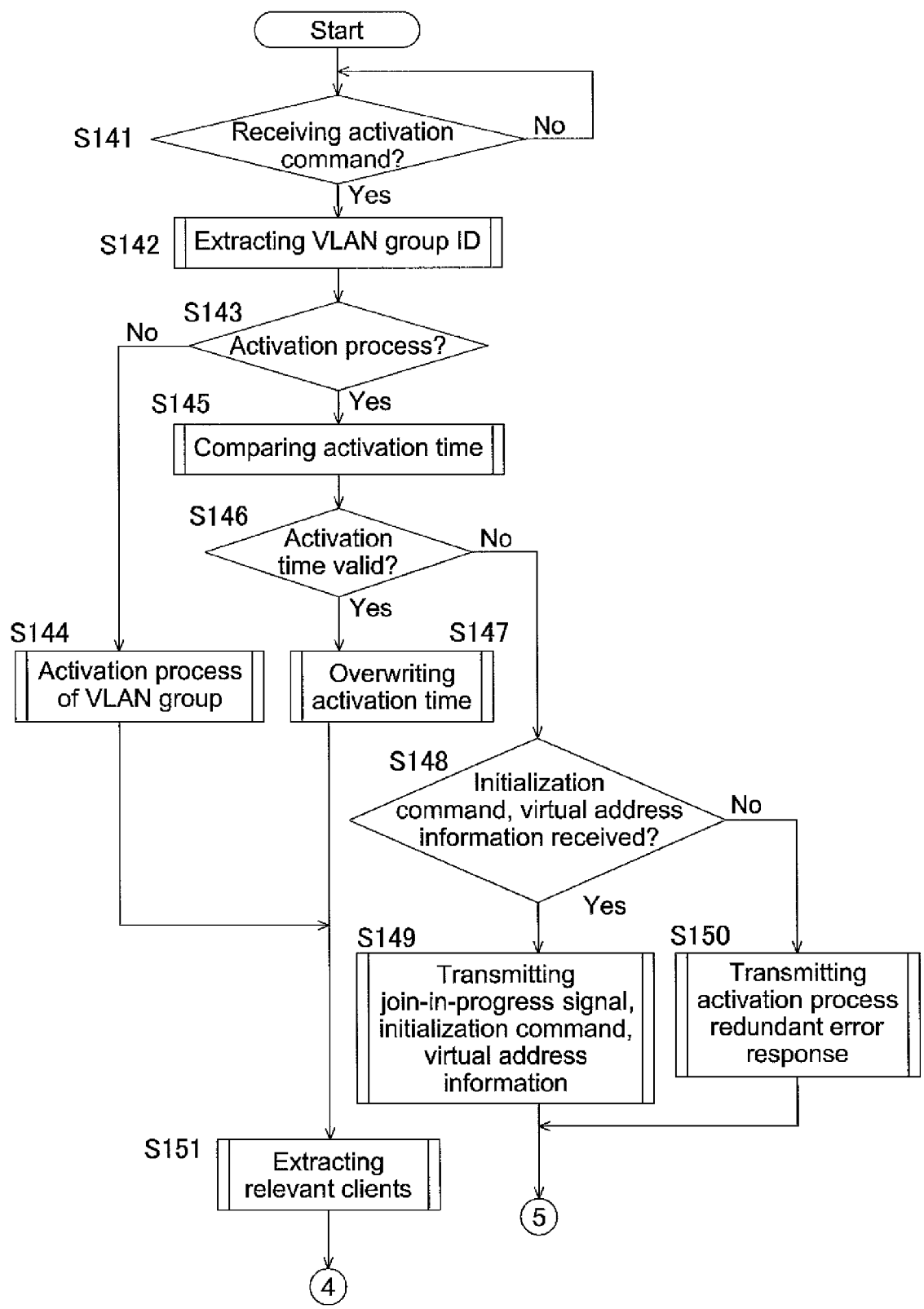
FIG. 23A is a first portion of a flowchart showing a process of transmitting a response signal by the relay server in response to the initialization command according to a preferred embodiment of the present invention.
Figure 23B:
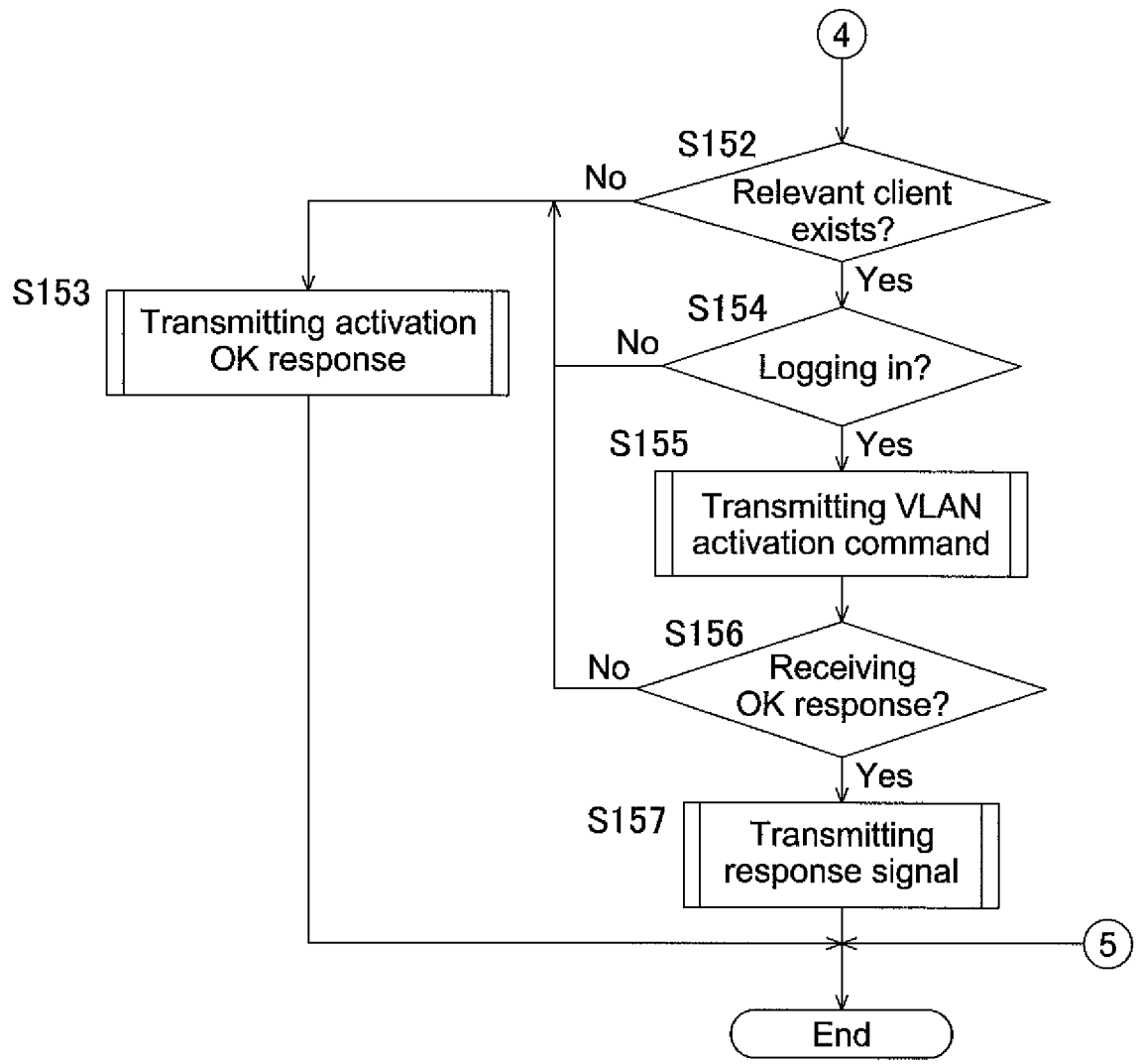
FIG. 23B is a second portion of the flowchart showing a process of transmitting a response signal by the relay server in response to the initialization command according to a preferred embodiment of the present invention.

First, referring to FIG. 23A and FIG. 23B, a process of transmitting a response signal by the second relay server B in response to the activation information will be explained. FIG. 23A and FIG. 23B are flowcharts showing a process of transmitting the response signal by the relay server in response to the activation information according to a preferred embodiment of the present invention. The activation command control unit 133 of the second relay server B extracts the identification information of the VLAN group from the VLAN group information 70 (step S142), when receiving activation information including the activation command, the activation time and the VLAN group information 70 from the first client terminal A (Yes at step S141). In this example, the activation command control unit 133 preferably extracts, from the VLAN group information 70, identification information "1279672104671.clientA1.rd.002@trial.net". Then, the activation command control unit 133 confirms whether or not the first VLAN group, having this identification information, has already been activated (step S143). If the first VLAN group has not been activated, the activation process of the first VLAN group is started (step S144), and a process proceeds to step S151 (described later).

On the other hand, if the first VLAN group has already been activated, the activation command control unit 133 compares the activation time received from the first client terminal A1 with the activation time included in the previously received activation information of the first VLAN group (step S145). If the activation time received from the first client terminal A1 is valid (Yes at step S146), the activation command control unit 133 overwrites the activation time of the already received activation information with the activation time received from the first client terminal A1 (step S147), and a process proceeds to step S151. Here, it is determined that the earlier activation time is the valid activation time.

If the activation time received from the first client terminal A1 is invalid (No at step S146), the activation command control unit 133 further determines whether or not the initialization command and the virtual address information have been received (step S148). In other words, the activation command control unit 133 determines whether or not, in the previous activation of the first VLAN group, a process of transmitting the initialization command and the virtual address information has already been executed.

If the activation command control unit 133 has received the initialization command and the virtual address information (Yes at step S148), the activation command control unit 133 transmits the join-in-progress signal, the received initialization command, and the virtual address information to the first client terminal A1 (step S149). As described above, the "join-in-progress signal" refers to a signal which permits the first client terminal A1 to join-in-progress to the VLAN group.

If the initialization command and the virtual address information have not been received (No at step S148), the activation command control unit 133 returns overlap error signal of the activation process to the first client terminal A1, and the activation process is finished (step S150). This is because if the virtual address information has not been received, it is impossible to execute a process of assigning the virtual address to the second relay server B based on the received virtual address information (refer to step S127, step S129 in FIG. 20B).

If the activation process of the first VLAN group is started (step S144), or the overwrite process of the activation time is executed (step S147), the activation command control unit 133 next executes a process of extracting the VLAN client terminals connected to the second relay server B from the VLAN group information 70 (step S151). If there is a VLAN client terminal connected to the second relay server B (Yes at step S152), the activation command control unit 133 determines whether or not the VLAN client terminal is a VLAN device (step S154). The "VLAN device" refers to a client terminal that is currently logging in and is not currently joining other VLAN groups. In this example, the activation command control unit 133 extracts the third client terminal B1 and the fourth client terminal B2 as VLAN devices. When determining whether or not the client terminal is a VLAN device, the activation command control unit 133 refers to the relay server information stored in the relay server information storage unit 142, and determines whether or not the third client terminal B1 and the fourth client terminal B2 are logging in. In addition, the activation command control unit 133 transmits the activation command to the third client terminal B1 and the fourth client terminal B2, which are logging in. Then, if the activation command control unit 133 receives an OK signal in response to the activation command from the third client terminal B1 and the fourth client terminal B2, the activation command control unit 133 determines that third client terminal B1 and the fourth client terminal B2 are VLAN devices.

After that, the activation command control unit 133 transmits the VLAN activation command to the third client terminal B1 and the fourth client terminal B2 (step S155). The VLAN activation command is a command which activates the VLAN client terminal as a VLAN device. If the activation command control unit 133 receives an OK response from the third client terminal B1 and the fourth client terminal B2 (Yes at step S156), the activation command control unit 133 transmits the response signal to the first client terminal A1 (step S157). The response signal preferably includes the identification information, the IP address and the MAC address of the third client terminal B1 and the fourth client terminal B2. In this case, the activation command control unit 133 executes IP communication with the third client terminal B1 and the fourth client terminal B2, which is logging in, via the LANs. Accordingly, the activation command control unit 133 does not need to ask the third client terminal B1 and the fourth client terminal B2 about the IP address and the MAC address of third client terminal B1 and the fourth client terminal B2. The first client terminal A1, which has received the response signal, creates the virtual address information 80 from the received response signal (refer to step S115 and step S116 in FIG. 20A).

If there is no VLAN client terminal connected to the second relay server B (No at step S152), the activation command control unit 133 transmits an activation OK signal to the first client terminal A1. The activation OK signal just represents an OK response to the activation command which has been received. If the VLAN device does not exist (No at step S154), or if the OK response in response to the transmission of the VLAN activation command is not received (No at step S156), the activation command control unit 133 also transmits the activation OK signal.

Next, a process of establishing the VLAN session by the relay server after the virtual address information is created by the client terminal will be described.

Figure 24:
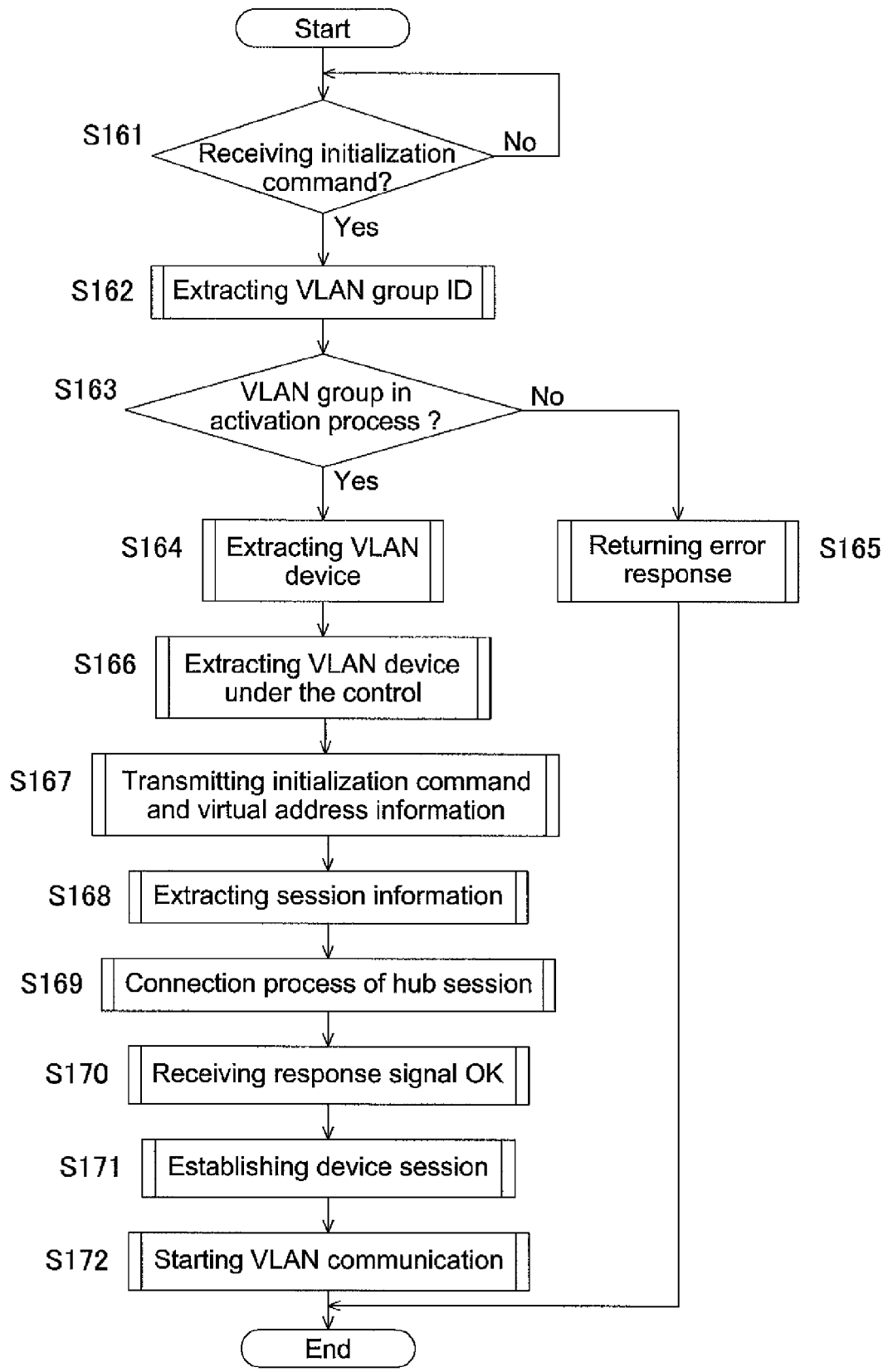
FIG. 24 is a flowchart showing a process of establishing the VLAN session in the relay server which has received the initialization command according to a preferred embodiment of the present invention.

First, referring to FIG. 24, a process when the second relay server B receives the virtual address information 80, which has been transmitted after the first client terminal A1 creates the virtual address information 80, and the initialization command (step S119 in FIG. 20A) will be described. FIG. 24 is a flowchart showing a process of establishing the VLAN session in a relay server that has received the initialization command according to a preferred embodiment of the present invention.

The VLAN session control unit 135 of the second relay server B, when receiving the virtual address information 80 and the initialization command from the first client terminal A1 (Yes at step S161), extracts identification information of the VLAN group from the initialization command (step S162). In this example, the VLAN session control unit 135 extracts "1279672104671.clientA1.rd.002@trial.net".

Next, the VLAN session control unit 135 determines whether or not the first VLAN group identified by the extracted identification information is in an activation process (step S163). If the first VLAN group is not in the activation process, an error reply is returned to the first client terminal A1 (step S165), and the process is finished.

On the other hand, if the first VLAN group is in the activation process, the VLAN session control unit 135 extracts the VLAN device from virtual address information 80 (step S164). In this example, the VLAN session control unit 135 extracts the first client terminal A1, the third client terminal B1, and the fourth client terminal B2, as VLAN devices. Next, the VLAN session control unit 135 refers to the VLAN group information 70 stored in the VLAN group information storage unit 144, and further extracts the VLAN devices under the control of the already extracted VLAN devices, i.e., the VLAN device connected to the second relay server B (step S166). In this example, the third client terminal B1 and the fourth client terminal B2 are preferably extracted. After that, the VLAN session control unit 135 forwards the received initialization command and the virtual address information 80 to the extracted third client terminal B1 and fourth client terminal B2 (step S167).

Next, the VLAN session control unit 135 extracts the session information 73 from the VLAN group information 70 (step S168). After extracting the session information 73, the VLAN session control unit 135 refers to the session information 73, and establishes a hub session in which the second relay server B is set as "sp" and that has not been established yet (step S169). However, in this example, since a VLAN device is not connected to the third relay server C, a hub session is preferably not established with the third relay server C.

After receiving a response signal meaning OK to the establishment of the hub session from the third relay server C (step S170), the VLAN session control unit 135 preferably refers to the VLAN group information 70, and establishes a device session with the VLAN devices connected to the second relay server B (step S171). In this example, the VLAN session control unit 135 refers to the VLAN client terminal information 72 of the VLAN group information 70, and establishes device sessions with the third client terminal B1 and the fourth client terminal B2 as VLAN devices.

After receiving the response signal meaning OK from the third client terminal B1 and the fourth client terminal B2, the client terminals can communicate with each other as VLAN devices using the virtual address and the VLAN session (step S172).

Figure 25:
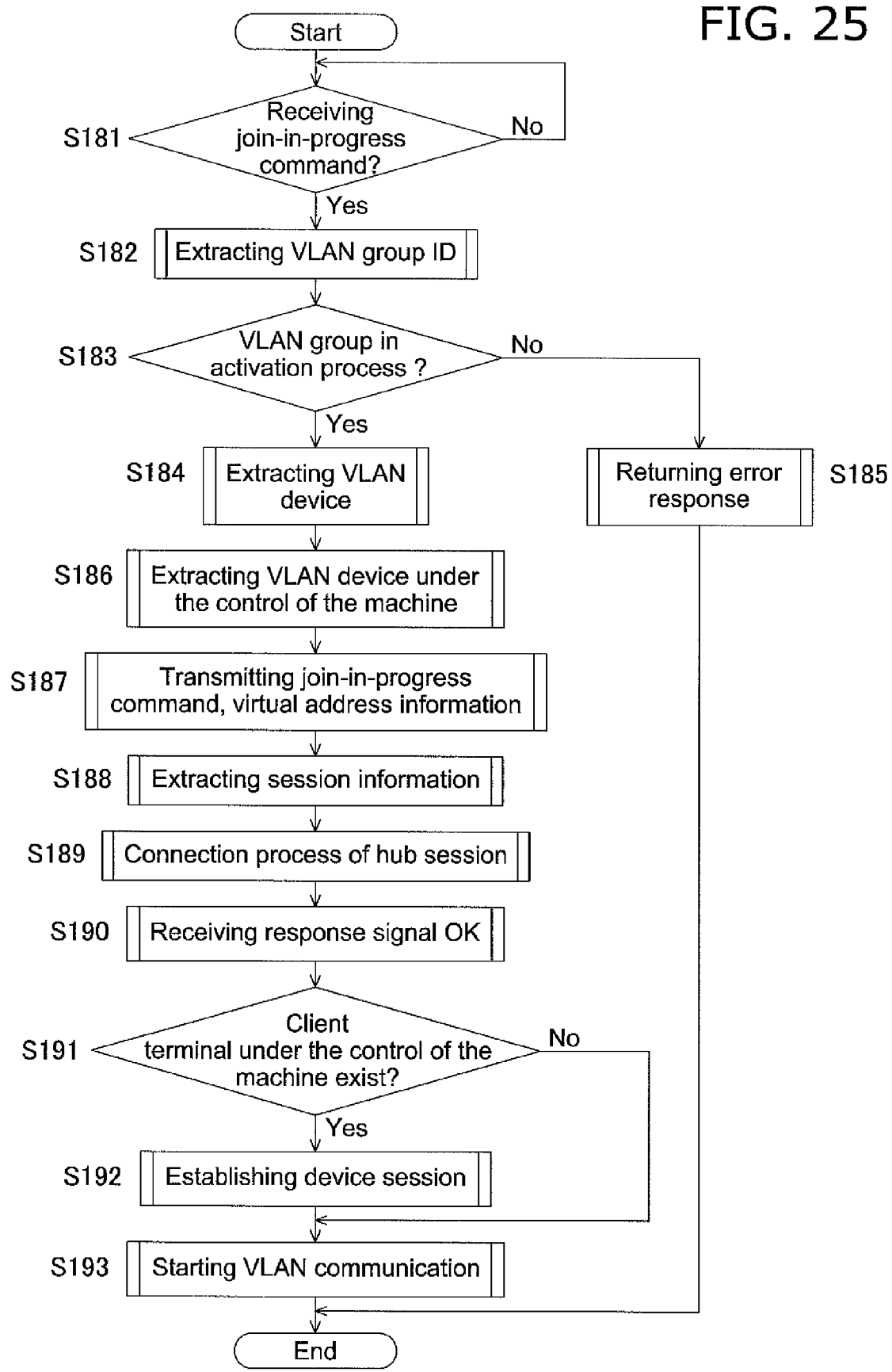
FIG. 25 is a flowchart showing a process of establishing the VLAN session in the relay server which has received the join-in-progress command according to a preferred embodiment of the present invention.

Next, a process performed by the second relay server B when the second relay server receives the updated virtual address information and join-in-progress command (refer to step S131 in FIG. 20B) from the first client terminal A1 will be described with reference to FIG. 25. FIG. 25 is a flowchart showing a process of establishing the VLAN session in the relay server which has received the join-in-progress command in accordance with a preferred embodiment of the present invention.

If the VLAN session control unit 135 of the second relay server B receives the virtual address information and the join-in-progress command from the first client terminal A1 (Yes at step S181), the VLAN session control unit 135 extracts the identification information of the VLAN group from the join-in-progress command (step S182).

Next, the VLAN session control unit 135 determines whether or not the first VLAN group identified by the extracted identification information is in an activation process (step S183). If the first VLAN group is not in the activation process, the VLAN session control unit 135 returns an error reply to the first client terminal A1 (step S185), and the process is finished.

On the other hand, if the first VLAN group is in the activation process, the VLAN session control unit 135 extracts the VLAN device from the updated virtual address information (step S184). Next, the VLAN session control unit 135 refers to the VLAN group information 70 stored in the VLAN group information storage unit 144, and extracts, from the VLAN devices, the VLAN devices under the control of the second relay server B, i.e., the VLAN devices connected to the second relay server B (step S186). After that, the VLAN session control unit 135 transmits the join-in-progress command and the updated virtual address information to the VLAN devices under the control of the second relay server B, i.e., the VLAN devices connected to the second relay server B (step S187).

Next, the VLAN session control unit 135 extracts the session information 73 from the VLAN group information 70 (step S188). After extracting the session information 73, the VLAN session control unit 135 refers to the session information 73, and establishes a hub session in which the second relay server B is set as "sp" and which has not been established yet (step S189). In other words, the VLAN session control unit 135 preferably uses the hub session which has already been established by the previous activation of the first VLAN group, and newly establishes a hub session that has needed to be established by joining of the VLAN client terminal which has been allowed the join-in-progress. At this time, among other relay servers serving as a hub, a process is performed to establish the hub session.

After receiving an OK response signal from a relay server to which the hub session is connected (step S190), the VLAN session control unit 135 refers to the VLAN group information 70, and determines whether or not there is a VLAN device under the control of the second relay server B, i.e., the VLAN device connected to the second relay server B exist (step S191). If there is a VLAN device under the control of the second relay server B (Yes at step S191), the VLAN session control unit 135 establishes a device session with the VLAN device under the control of the second relay server B (step S191).

If the device session is established with the VLAN devices under the control of the second relay server B, or if there is no VLAN device under the control of the second relay server B (No at step S191), then the client terminals can communicate with each other as VLAN devices using the virtual address and the VLAN session (step S193).

When the data is being transferred between the VLAN devices via the VLAN session using the virtual address as described above, the operation of the VLAN device and the relay server connected to the VLAN device may be suspended. The suspension of the operation is a state in which the VLAN device and the relay server to which the VLAN device is connected cannot communicate with each other due to the suspension of the operation by logging out and the like and the data cannot be communicated. The operation of the relay server in this state will be described with reference to FIG. 26. Below, the operation of the second relay server B will be described when the operation of the fourth client terminal B2 is suspended in the activated first VLAN group.

As described above, in the relay communication system of this preferred embodiment of the present invention, changes in the number and connection states of the relay servers and the client terminals in the relay group are preferably shared in the whole relay communication system in real time or substantially in real time. Accordingly, if the operation of the fourth client terminal B2 is suspended, the second relay server B instantly updates the relay group information, the relay server information, and the client terminal information, and notifies the other relay servers. Furthermore, the other relay server instantly notifies the client terminal recited in the client terminal information that the relay group information and the relay server information have been updated.

First, if the suspension processing unit 137 of the second relay server B receives the updated relay group information and relay server information, it determines whether or not it has received the notification of suspension of operation of the relay server (step S201). In other words, it is determined whether or not the update of relay group information and the relay server information is caused by the change in the connection state of the relay servers. If the notification of suspension of operation of the relay server is received (Yes at step S201), the suspension processing unit 137 extracts identification information of the client terminal connected to the relay server which has suspended the operation, from the relay server information (step S202).

On the other hand, if the notification of suspension of the operation of the relay server is not received (No at step S201), the suspension processing unit 137 of the second relay server B determines whether or not the notification of suspending the operation of the client terminal has been received (step S203). In other words, it is determined whether or not the update of the relay group information and the relay server information is caused by the change in the connection state of the client terminals. If the notification of suspending the operation of the client terminal is not received (No at step S203), the suspension processing unit 137 preferably finishes the process.

The suspension processing unit 137 creates a list of the client terminals that performs a suspension process (step S204), if the identification information of the client terminal is extracted at step S202, or if the notification of suspending the operation of the client terminal at step S203 is received. In this example, the list in which the fourth client terminal B2 is recited, whose operation was suspended is created. If the notification of suspending the operation of the relay server is received, the client terminals extracted at step S202 are preferably put on the list.

Next, the suspension processing unit 137 determines whether or not there is a VLAN group that is active (step S205). In this example, since the first VLAN group is being activated, a process proceeds to step S206. If there is no VLAN group in an active state (No at step S205), the suspension processing unit 137 finishes the process.

After that, the suspension processing unit 137 reads out a client terminal put on the created list (step S206), and determines whether or not there is a VLAN device that constitutes the VLAN group in the activated state in the list (step S207). In this example, the fourth client terminal B2 is a VLAN device in the first VLAN group. Therefore, the suspension processing unit 137 preferably notifies VLAN devices except the fourth client terminal B2 via the relay servers that the fourth client terminal B2 should be deleted from the virtual address information (step S208). It should be noted that the virtual address control unit 234 of the VLAN devices which have received the notification deletes the fourth client terminal B2 from the virtual address information. Furthermore, the VLAN session control unit 135 of the relay server closes a device session related to the fourth client terminal B2, which has been deleted from the virtual address information. In this example, the VLAN session control unit 135 closes a device session between the fourth client terminal B2 and the second relay server B.

Next, the suspension processing unit 137 determines whether or not the current number of the VLAN devices is two or more (step S209). This is because, if the number of the activated VLAN device which is activated becomes one or less by a process at step S208, the communication via the VLAN session cannot be realized. In this example, two VLAN devices exist, i.e., the first client terminal A1 and the third client terminal B1. Accordingly, the suspension processing unit 137 proceeds to step S211, and determines whether or not there are other VLAN devices whose VLAN session should be closed, if there is a VLAN device to be closed (Yes at step S211), it returns to step S206. On the other hand, the suspension processing unit 137 returns to step S205 if there is no other VLAN device whose VLAN session should be closed (No at step S211). If there is an activated VLAN group at this time (Yes at step S205), the above-described processes below step S205 will be performed. On the other hand, if there is no activated VLAN group (No at step S205), the suspension processing unit 137 preferably finishes the process.

The suspension processing unit 137 performs a process of suspending the VLAN group (step S210) if it is determined that the number of the VLAN devices is one or less at step S209 (No at step S209). In this example, the hub session and the device session as VLAN session established in the first VLAN group is closed. After that, the process returns to step S205, and then if there is no activated VLAN group (No at step S205), the suspension processing unit 137 finishes the process.

Figure 27:
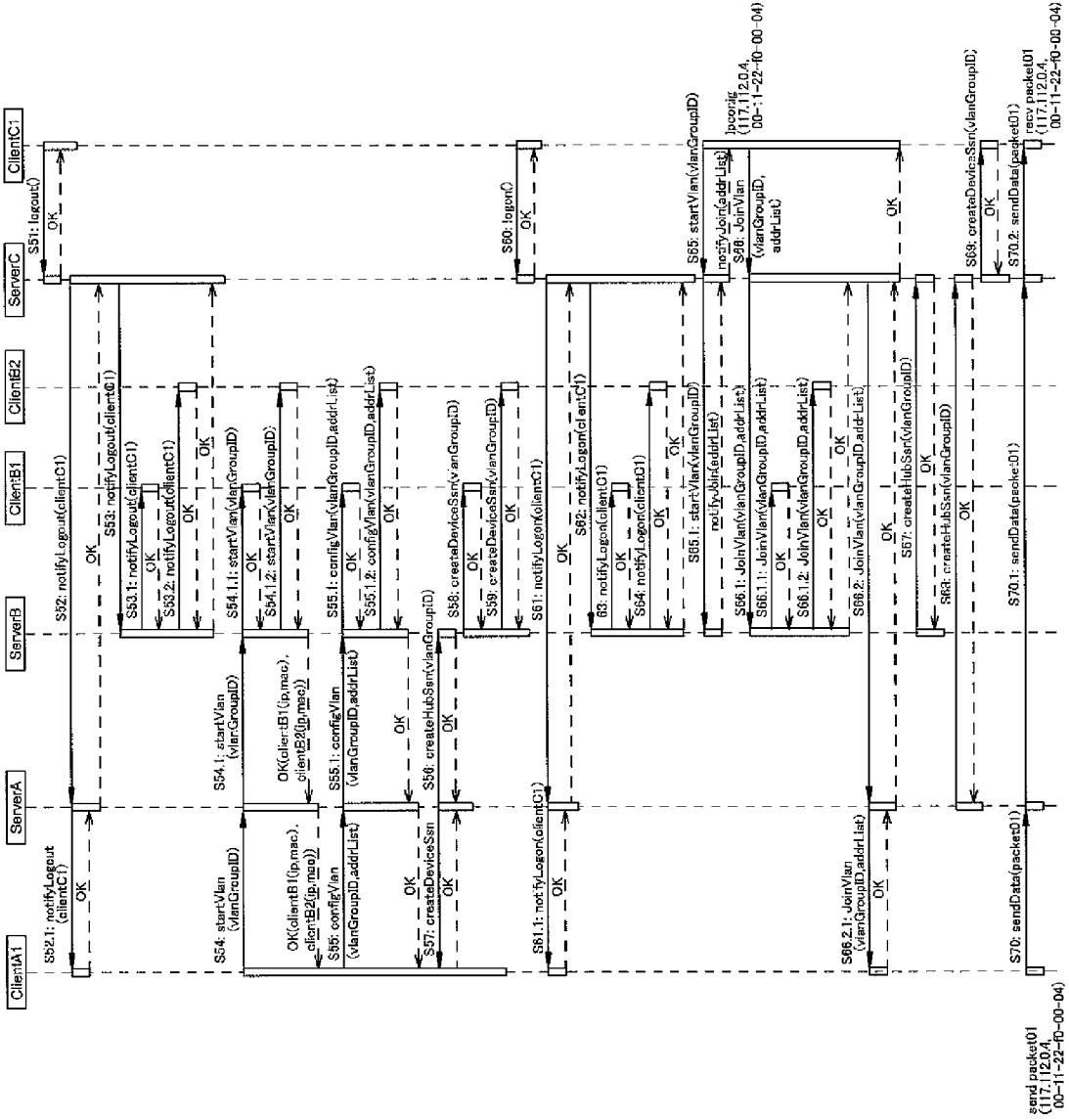
FIG. 27 is a view showing an example of a process related to establishment of VLAN session according to a preferred embodiment of the present invention.
Figure 28:
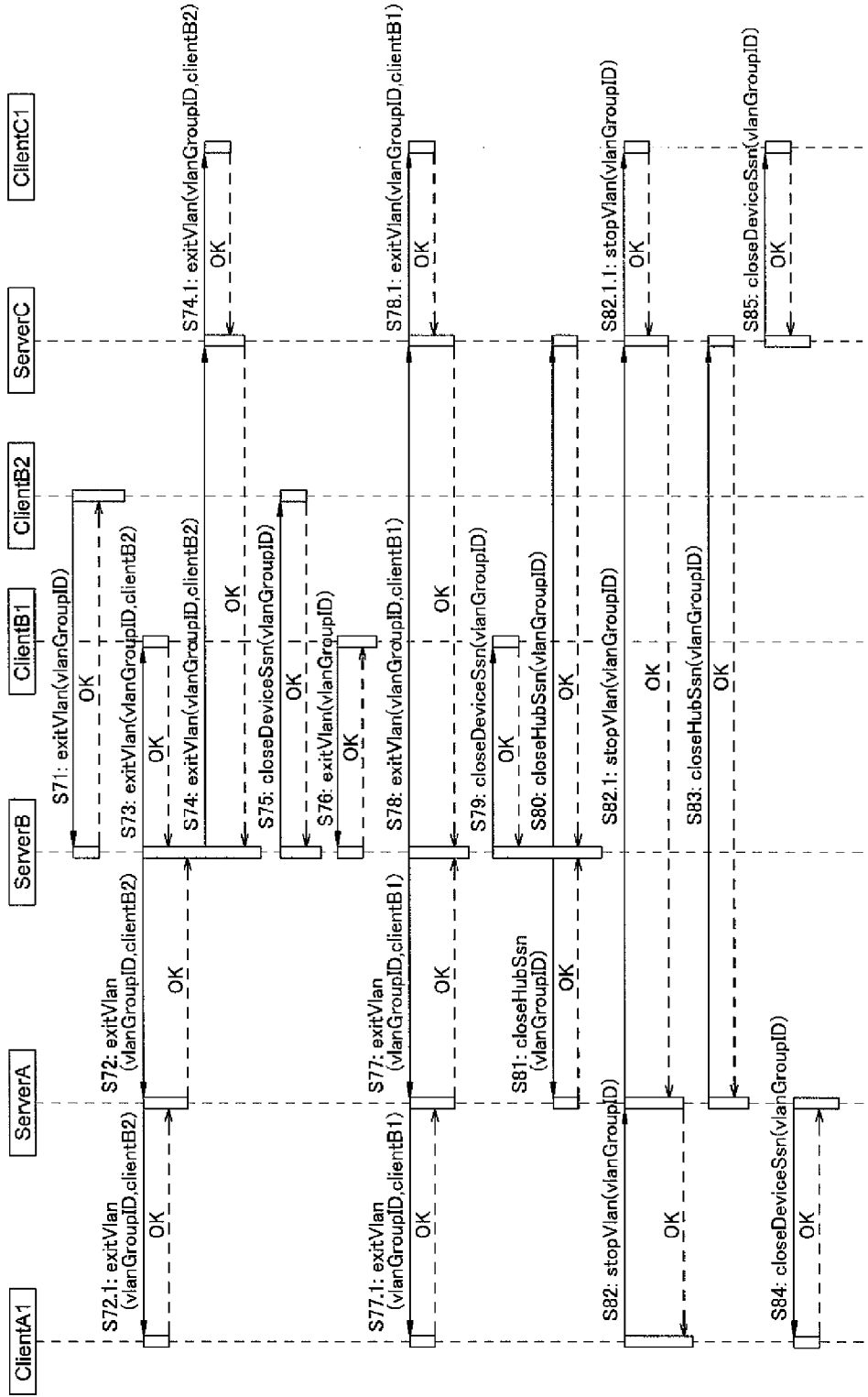
FIG. 28 is a view showing an example of a suspension process of the VLAN session according to a preferred embodiment of the present invention.

With reference to a sequence diagram of FIG. 27 and FIG. 28, a flow of data when the VLAN session is established in accordance with a preferred embodiment of the present invention will be described.

Below, a process of establishing a VLAN session in the first VLAN group will be described with reference to a following example of a preferred embodiment of the present invention. In this example below, in a state wherein the VLAN group information 70 is shared among the first client terminal A1, the third client terminal B1, the fourth client terminal B2, and the fifth client terminal C1 (refer to FIG. 19), the fifth client terminal C1 logs out from the first relay group. After that, after the VLAN session is established in the first VLAN group, the fifth client terminal C1 logs on, and the fifth client terminal C1 receives an activation instruction of the first VLAN group from a user.

During this time, the relay servers in the first relay group preferably communicate, using the ordinary IP address and MAC address, with the activated other relay servers in the first relay group via the WAN interface. And, among the relay servers, change in the connection state in the first relay group is shared. The activated client terminals in the first relay group communicate with the relay servers to which the client terminals are connected via the LAN interface. And, between the client terminal and the relay server, the change in the connection state in the relay communication system is shared.

First, the fifth client terminal C1 logs out from the first relay group. Specifically, the fifth client terminal C1 notifies the third relay server C of the logging-out (step S51: logout( )), and receives OK from the third relay server C. The third relay server C, to which the logging-out has been notified, refers to the relay server information, and notifies the first relay server A1 of the logging-out of the fifth client terminal C1 (step S52:notifyLogout(clientC1)). The first relay server A refers to the relay server information, and notifies the first client terminal A1 of the logging-out of the fifth client terminal C1 (step S53:notifyLogout (clientC1)). If OK is returned from the first client terminal A1, the first relay server A returns OK to the third relay server C. In this example, although not shown in the figures, the first relay server A preferably refers to the relay server information, and notifies the second client terminal A2, which constitutes the first relay group, of the logging-out of the fifth client terminal C1.

Furthermore, the third relay server C preferably refers to the relay server information, and notifies the second relay server B of the logging-out of the fifth client terminal C1 (step S53:notifyLogout (clientC1)). The second relay server B refers to the relay server information, and notifies the third client terminal B1 of the logging-out of the fifth client terminal C1 (step S53.1:notifyLogout(clientC1)). Furthermore, the second relay server B refers to the relay server information, and notifies the fourth client terminal B2 of the logging-out of the fifth client terminal C1 (step S53.2:notifyLogout (clientC1)). If OK is returned from the third client terminal B1 and the fourth client terminal B2, the second relay server B returns OK to the third relay server C. According to the above-described process, all of the relay servers and the client terminals in the first relay group share the logging-out of the fifth client terminal C1.

After that, if the first client terminal A receives the activation instruction of the first VLAN group from a user, a process of activating the first VLAN group is started. First, the first client terminal A1 transmits the activation information including the activation command, the activation time, and the VLAN group information, via the first relay server A to the second relay server B, which serves as a hub in the VLAN group and is in the activated state (step S54: StartVlan(vlanGroupID), step S54.1: StartVlan(vlanGroupID)). The second relay server B refers to the VLAN group information 70, and extracts the third client terminal B1 and the fourth client terminal B2, which are VLAN client terminals connected to the second relay server B. Then, the second relay server B preferably determines whether or not the third client terminal B1 and the fourth client terminal B2 are the VLAN device, and then transmits the activation information to the VLAN device. In this example, the third client terminal B1 and the fourth client terminal B2 are both in active state, the second relay server B first transmits the activation information to the third client terminal B1 (step S54.1.1: StartVlan(vlanGroupID)). Furthermore, the second relay server B transmits the activation information to the fourth client terminal B2 (step S54.1.2: StartVlan(vlanGroupID)).

After receiving the OK from the third client terminal B1 and the fourth client terminal B2, the second relay server B transmits the response signal (OK (clientB1(ip,mac), clientB2(ip,mac))) to the first client terminal A1 via the first relay server A. The response signal includes identification information, IP addresses and MAC addresses of the third client terminal B1 and the fourth client terminal B2.

Next, the first client terminal A1 performs a process of extracting from the response signal and a process of creating the virtual address information (refer to step S116, S118 in FIG. 20A), and transmits the initialization command and the created virtual address information 80 to the relay serves to which the VLAN device and the VLAN device are connected. The virtual address information 80 preferably includes, as shown in FIG. 12, the identification information, the virtual IP address and the virtual MAC address of the first client terminal A1, the third client terminal B1, and the fourth client terminal B2.

First, the first client terminal A1 transmits initialization command and virtual address information, via the first relay server A, to the second relay server B (step S55: "configVlan (vlanDroupID, addrList)", step S55.1: "configVlan(vlanDroupID, addrList)"). Next, the second relay server B transmits initialization command and virtual address information to the third client terminal B1 (step S55.1.1: "configVlan (vlanDroupID, addrList)"), which has been extracted through the extraction process (refer to step S161 through step S164 and step S166 in FIG. 24). The second relay server B transmits the initialization command and virtual address information to the extracted fourth client terminal B2 (step S55.1.2: "configVlan(vlanGroupID, addrList)"). After receiving the OK from the third client terminal B1 and the fourth client terminal B2, the second relay server B returns OK to the first relay server A. The first relay server A that has received the OK returns the OK to the first client terminal A1. According to the above-described process, the virtual address information is transmitted to all of the VLAN devices in the first the VLAN group.

After that, the relay server to which the VLAN device is connected preferably refers to the session information 73 of the VLAN group information 70, and establishes a hub session in which the relay server is set as "sp" and that has not been established yet. In this example, any of the hub sessions have not been established yet. Therefore, the first relay server A, which is designated as "sp", requests the second relay server B, which is designated as "ep", to establish a hub session (step S56: createHubSsn(vlanGroupID)). If the OK is returned from the second relay server B, a hub session is established between the first relay server A and the second relay server B.

If the hub session is established, a relay server to which the VLAN device is connected establishes a device session with a VLAN device connected to the relay server. First, the first relay server A requests the first client terminal A1 to establish a device session (step S57: createDeviceSsn(vlanGroupID)). If the OK is returned from the first client terminal A1, a device session is established between the first relay server A and the first client terminal A1.

The second relay server B requests the third client terminal B1 to establish a device session (step S58: createDeviceSsn (vlanGroupID)). If the OK is returned from the third client terminal B1, a device session is established between the second relay server B and the third client terminal B1. Furthermore, the second relay server B requests the fourth client terminal B2 to establish a device session (step S59: createDeviceSsn(vlanGroupID)). If the OK is returned from the fourth client terminal B2, a device session is established between the second relay server B and the fourth client terminal B2.

As described above, if a VLAN session is established including a hub session and a device session in the VLAN group, the VLAN devices initializes the VLAN interfaces of the LAN devices, and set the virtual addresses in the VLAN interfaces. If the virtual address is set in the VLAN devices, the client terminals can communicate with each other as VLAN devices using the virtual address and the VLAN session.

In this state, the fifth client terminal C1 logs on again. Specifically, the fifth client terminal C1 notifies the third relay server C of the logging-on (step S60:logon( )), and receives OK from the third relay server C. The third relay server C, to which the logging-on has been notified, refers to the relay server information, and notifies the first relay server A of the logging-on of the fifth client terminal C1 (step S61:notifylogon(clientC1)). The first relay server A refers to the relay server information, and notifies the first client terminal A1 of the logging-on of the fifth client terminal C1 (step S61.1: notifylogon(clientC1)). If OK is returned from the first client terminal A1, the first relay server A returns OK to the third relay server C. Although not shown in the figures, the first relay server A preferably refers to the relay server information, and notifies the second client terminal A2 as well, which constitutes the first relay group, of the logging-on of the fifth client terminal C1.

Furthermore, the third relay server C refers to the relay server information, and notifies the second relay server B of the logging-on of the fifth client terminal C1 (step S62:notifylogon(clientC1)). The second relay server B refers to the relay server information, and notifies the third client terminal B1 of the logging-on of the fifth client terminal C1 (step S63:notifylogon(clientC1)). The second relay server B refers to the relay server information, and notifies the fourth client terminal B2 of the logging-on of the fifth client terminal C1 (step S64:notifylogon(clientC1)). If OK is returned from the third client terminal B1 and the fourth client terminal B2, the second relay server B returns OK to the third relay server C. According to the above-described process, all of the relay servers and the client terminals in the first relay group share the logging-on of the fifth client terminal C1.

After that, the fifth client terminal C1 transmits the activation information including the activation command, the activation time and the VLAN group information 70, to the third relay server C (step S65: StartVlan(vlanGroupID)), when receiving the activation instruction of the first the VLAN group from a user. The transmitted activation information is further transmitted to the second relay server B, which serves as a hub in the VLAN group and is in an activated state (step S65.1: StartVlan(vlanGroupID)).

At this time, the second relay server B extracts the identification information of the VLAN group from the VLAN group information 70 of the received activation information, and determines whether or not the first the VLAN group has been activated. In this example, the first VLAN group has preferably already been activated as shown in step S54, S54.1. Furthermore, the second relay server B determines whether or not the activation time of the received activation information is valid, and determines whether or not it has already received initialization command and virtual address information related to the first the VLAN group. Then, the second relay server B transmits the join-in-progress signal (notifyJoin(addrList)) to the fifth client terminal C1 (refer to step S143 through S146, S148 through S149 in FIG. 23A).

In this example, the activation time received from the fifth client terminal C1 is later than the activation time received by the first client terminal A1 at step S54 and S54.1, the second relay server B determines that the activation time received from fifth client terminal C1 is not valid. Furthermore, the second relay server B has already received the initialization command and the virtual address information at step S55 and S55.1. Accordingly, the second relay server B transmits the initialization command, the virtual address information and the join-in-progress signal, to the fifth client terminal C1, via the third relay server C.

The fifth client terminal C1, which has received the join-in-progress signal, refers to the assigned virtual address extracted from the virtual address information, determines the virtual address for the fifth client terminal C1 and updates the virtual address information. Then, the fifth client terminal C1 transmits the updated virtual address information (refer to step S123 through S131 in FIG. 20B). In this example, the fifth client terminal C1 determines that the virtual address can be determined for the fifth client terminal C1, and preferably assigns virtual IP address and virtual MAC address (177.112.0.4, 00-11-22-f0-00-04) to the fifth client terminal C1, which are formed by changing the ends of the extracted and assigned virtual IP address and virtual MAC address. After that, the updated virtual address information and join-in-progress command is transmitted to the VLAN devices based on the updated virtual address information and the VLAN group information 70.

First, the fifth client terminal C1 transmits the updated virtual address information and join-in-progress command to the second relay server B via the third relay server C (step S66:joinvlan(vlanGroupID, addr List)), step S66.1:joinvlan (vlanGroupID, addrList)). The second relay server B transmits the updated virtual address information and join-in-progress command to the third client terminal B1 (step S66.1.1:joinvlan(vlanGroupID, addrList)). Furthermore, the second relay server B transmits the updated virtual address information and join-in-progress command to the fourth client terminal B2 (step S66.1.2:joinvlan(vlanGroupID, addrList)). If OK is returned from the third client terminal B1 and the fourth client terminal B2, the second relay server B returns OK to the third relay server C.

The third relay server C transmits the updated virtual address information and join in-progress command to the first client terminal A1 via the first relay server A (step S66.2: joinvlan(vlanGroupID, addrList), step S66.2.1:joinvlan (vlanGroupID, addrList)). If the OK is returned from the first client terminal A1, the first relay server A returns the OK to the third relay server C.

According to the above-described processes, the updated virtual address information is transmitted to the VLAN device.

After that, the relay server to which the VLAN device is connected refers to the session information 73 of the VLAN group information 70, and establishes a hub session in which the relay server is set as "sp" and which has not been established yet. In this example, a session between the first relay server A and the third relay server C, and a session between the second relay server B and the third relay server C preferably have not been established yet. Therefore, first, the second relay server B, which is designated as "sp", requests the third relay server C, which is designated as "ep", to establish a hub session (step S67: createHubSsn(vlanGroupID)). If OK is returned from the third relay server B, a hub session is established between the second relay server B and the third relay server C. Furthermore, the first relay server A, which is designated as "sp", requests the third relay server C, which is designated as "ep", to establish a hub session (step S68: createHubSsn(vlanGroupID)). If OK is returned from the third relay server C, a hub session is established between the first relay server A and the third relay server C.

If an unestablished device session between the relay server and the VLAN devices connected to the relay servers exists, the relay sever connected to the VLAN device establishes a device session. In this example, the third relay server C requests the fifth client terminal C1 to establish a device session between each other (step S69: createDeviceSsn(vlanGroupID)). If OK is returned from the fifth client terminal C1, a devices session is established between the third relay server C and the fifth client terminal C1.

As described above, if the VLAN session including the hub session and the device session is established in the VLAN group as described above, the VLAN device initializes the VLAN interface of the VLAN device, and sets the virtual addresses in the VLAN interface. If the virtual address is set in the VLAN device, the client terminals can communicate with each other as VLAN devices using the virtual address and the VLAN session.

For example, the first client terminal A1, having virtual IP address "117.112.0.1" and virtual MAC address "00.11.22: f0:00:01", can transfer the data via the VLAN session to the fifth client terminal C1, having virtual IP address "117.112.0.4" and virtual MAC address "00.11.22:f0:00:04". Specifically, the first client terminal A1 transmits a communication packet to the first relay server A via the device session (step S70: sendData(packet01)). The communication packet includes the virtual address of the fifth client terminal C1 as a transmission target and the data to be transmitted.

Next, the first relay server A transmits the communication packet to the third relay server C via the hub session (step S70.1: sendData(packet01)). After that, the third relay server C transmits the communication packet to the fifth client terminal C1 via the device session (step S70.2: sendData (packet01)).

Next, in a state in which the data transfer is performed via the VLAN session as described above, a process that is performed when the operation of the VLAN device is suspended will be described with reference to FIG. 28. In this example, the operation of the fourth client terminal B2 and the third client terminal B1 are preferably suspended.

First, if the fourth client terminal B2 is suspended, the fourth client terminal B2 notifies the second relay server B of the suspension of the operation of the fourth client terminal B2 (step S71:exitVlan(vlanGroupID)), and OK is returned from the second relay server B. The second relay server B, to which the suspension of the operation has been notified, refers to the relay server information, and notifies the third client terminal B1 of the suspension of the operation of the fourth client terminal B2 (step S73:exitVlan(vlanGroupID, clientB2)). The third client terminal B1 returns OK to the second relay server B.

Furthermore, the second relay server B refers to the relay server information, and notifies the first relay server A of the suspension of the operation of the fourth client terminal B2 (step S72:exitVlan(vlanGroupID,clientB2)). The first relay server A refers to the relay server information, and notifies the first client terminal A1 of the suspension of the operation of the fourth client terminal B2 (step S72.1:exitVlan(vlanGroupID,clientB2)). If OK is returned from the first client terminal A1, the first relay server A returns OK to the second relay server B. Although not shown in the figures, the first relay server A preferably refers to the relay server information, and notifies also the second client terminal A2, which constitutes the first relay group, of the suspension of the operation of the fourth client terminal B2.

Furthermore, the second relay server B refers to the relay server information, and notifies the third relay server C of the suspension of the operation of the fourth client terminal B2 (step S74:exitVlan(vlanGroupID,clientB2)). The third relay server C refers to the relay server information, and notifies the fifth client terminal C1 of the suspension of the operation of the fourth client terminal B2 (step S74.1:exitVlan(vlanGroupID,clientB2)). If OK is returned from the fifth client terminal C1, the third relay server C returns OK to the second relay server B. According to the above-described process, all of the relay servers and the client terminals in the first relay group share the suspension of the operation of the fourth client terminal B2.

Figure 26:
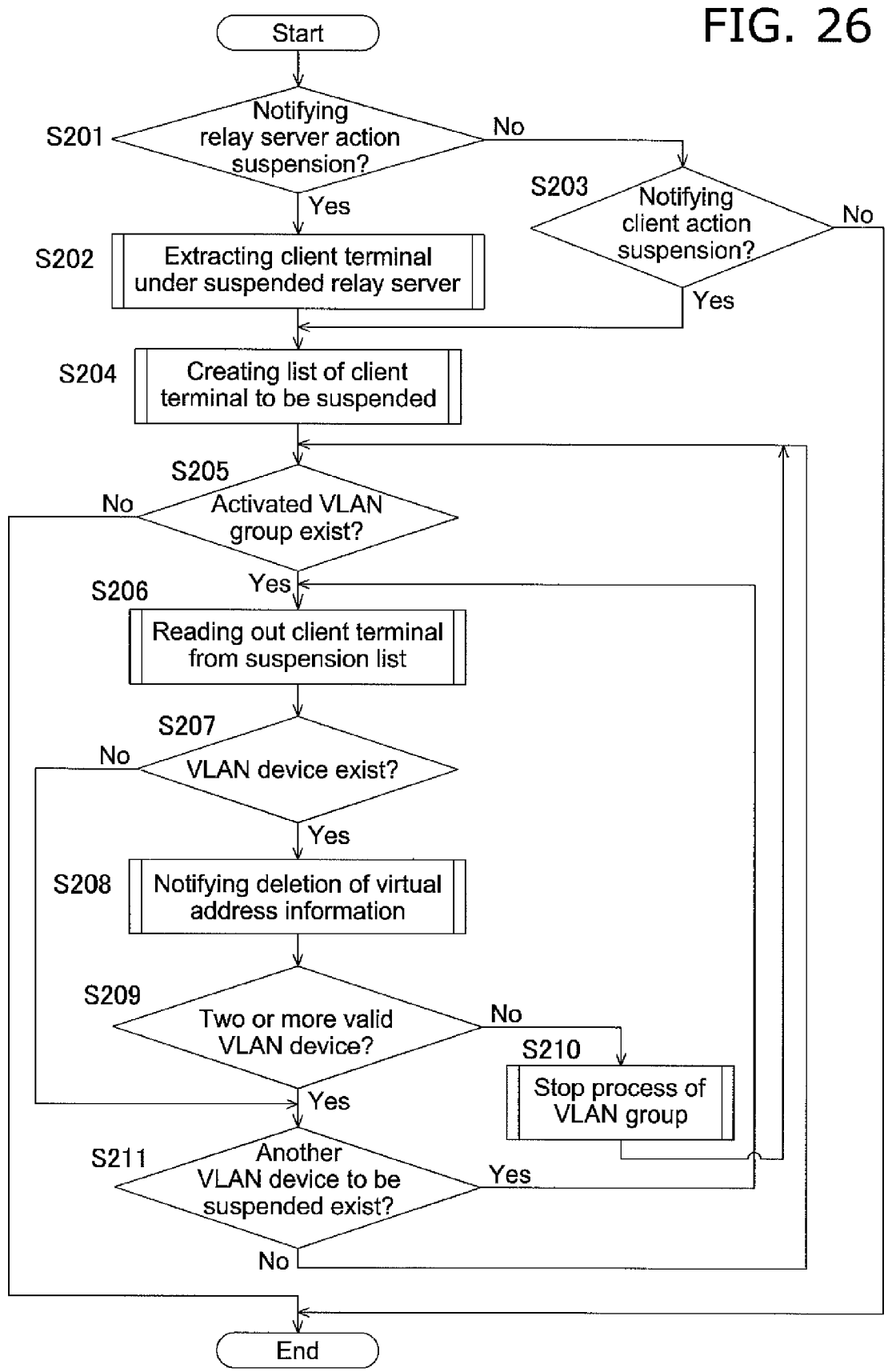
FIG. 26 is a flowchart showing the operation of the relay server in a case where the operation is suspended according to a preferred embodiment of the present invention.

After that, the second relay server B preferably notifies the VLAN devices, in response to the reception of the notification of the suspension of the fourth client terminal B2 operation, that the fourth client terminal B2 should be deleted from the virtual address information (refer to step S203 through step S208 in FIG. 26). In addition, the second relay server B requests the fourth client terminal B2 to close the device session between the second relay server B and the fourth client terminal B2 (step S75:closeDeviceSsn(vlanGroupID)). If OK is returned from the fourth client terminal B2, the device session between the second relay server B and the fourth client terminal B2 is closed.

Next, the operation of the third client terminal B1 is suspended. Specifically, the third client terminal B1 notifies the second relay server B of the suspension of operation (step S76:exitVlan(vlanGroupID)), and OK is returned from the second relay server B.

The second relay server B, to which the suspension of operation has been notified, refers to the relay server information, and notifies the first relay server A of the suspension of the operation of the third client terminal B1 (step S77: exitVlan(vlanGroupID,clientB1)). The first relay server A refers to the relay server information, and notifies the first client terminal A1 of the suspension of the operation of the third client terminal B1 (step S77.1:exitVlan(vlanGroupID, clientB1)). If OK is returned from the first client terminal A1, the first relay server A returns OK to the second relay server B. Although not shown in figures, the first relay server A refers to the relay server information, and notifies also the second client terminal A2, which constitutes the first relay group, of the suspension of the operation of the third client terminal B1.

Furthermore, the second relay server B refers to the relay server information, and notifies the third relay server C of the suspension of operation of the third client terminal B1 (step S78:exitVlan(vlanGroupID,clientB1)). The third relay server C refers to the relay server information, and notifies the fifth client terminal C1 of the suspension of operation of the third client terminal B1 (step S78.1:exitVlan(vlanGroupID,clientB1)). If OK is returned from the fifth client terminal C1, the third relay server C returns OK to the second relay server B. According to the above-described process, all of the relay servers and the client terminals in the first relay group preferably share the suspension of the operation of the third client terminal B1.

At this time, the second relay server B notifies the VLAN devices that they should delete the third client terminal B1 from the virtual address information in response to notification of the suspension of operation of the third client terminal B1 (refer to step S203 through step S208 in FIG. 26). Furthermore, the second relay server B requests the third client terminal B1 to close a device session between the second relay server B and the third client terminal B1 (step S79: closeDeviceSsn(vlanGroupID)). If OK is returned from the third client terminal B1, the device session between the second relay server B and the third client terminal B1 is closed.

Furthermore, the second relay server B requests the third relay server C to close a hub session between the second relay server B and the third relay server C (step S80:closeHubSsn (vlanGroupID)). If OK is returned from the third relay server C, the hub session between the second relay server B and the third relay server C is closed. Next, the second relay server B requests the first relay server A to close a hub session between the second relay server B and the first relay server A (step S81:closeHubSsn(vlanGroupID)). If OK is returned from the first relay server A, the hub session between the second relay server B and the first relay server A is closed.

As described above, when the operations of the fourth client terminal B2 and the third client terminal B1 as VLAN devices are suspended during the activation of the first VLAN session, information of the fourth client terminal B2 and the third client terminal B1 is deleted from the virtual address information. Furthermore, all of the hub sessions and the device sessions related to the fourth client terminal B2 and the third client terminal B1 are preferably closed.

It should be noted that, in the above state, after the fourth client terminal B2 and the third client terminal B1 are deleted from the virtual address information, the first client terminal A1 and the fifth client terminal C1 exist as activated VLAN devices. Accordingly, the second relay server B preferably does not perform a process of suspending the first VLAN group (refer to step S209, step S210 in FIG. 26).

The VLAN session in the VLAN group may be closed based on the instruction form a user. Below, an example will be described in which a process of closing the first VLAN group is executed after the first client terminal A1 receives an instruction of closing the first the VLAN group from a user.

First, the first client terminal A1 receives the instruction of closing the first the VLAN group from a user, and requests the fifth client terminal C1 to suspend the first VLAN group. Specifically, the first client terminal A1 transmits a closing signal of the first VLAN group to the first relay server A (step S82:stopVlan(vlanGroupID)). The first relay server A transmits the closing signal of the first VLAN group to the third relay server C (step S82.1:stopVlan(vlanGroupID)). The third relay server C transmits the closing signal of the first VLAN group to the fifth client terminal C1 (step S82.1.1: stopVlan(vlanGroupID)). If OK is returned from the fifth client terminal C1, the third relay server C returns OK to the first relay server A. The first relay server A returns OK to the first client terminal A1.

After that, the first relay server A requests the third relay server C to close the hub session (step S83:closeHubSsn (vlanGroupID)). If OK is returned from the third relay server C, the hub session between the first relay server A and the third relay server C is closed.

If the hub session is closed, the first relay server A requests the first client terminal A1 to close the device session between the first relay server and the first client terminal A1 (step S84:closeDeviceSsn(vlanGroupID)). If OK is returned from the first client terminal A1, the device session between the first relay server A and the first client terminal A1 is closed. Furthermore, the third relay server C requests the fifth client terminal C1 to close the device session between the third relay server C and the fifth client terminal C1 (step S85:closeDeviceSsn(vlanGroupID)). If OK is returned from the fifth client terminal C1, the device session between the third relay server C and the fifth client terminal C1 is closed.

In the relay communication system of this preferred embodiment, the VLAN group information is shared between the VLAN groups. In addition, when the VLAN group is activated, a process of establishing a VLAN session between the VLAN devices is performed, and a process of sharing the virtual address information created when the VLAN group is activated among the VLAN devices is performed. In addition, a process is performed of setting the virtual address in the VLAN interface of the VLAN device, and then the data is transmitted from and to the VLAN devices via the VLAN interfaces and the VLAN session. As described above, in the relay communication system of this preferred embodiment, the client terminals can preferably communicate with each other as VLAN devices using the virtual address and the VLAN session.

Furthermore, in the relay communication system of this preferred embodiment of the present invention, it is possible to address the overlapped activation of the same VLAN group. And if the activation instructions of the VLAN group are overlapped with each other, the VLAN client terminal that later performed the activation instruction of the VLAN group can join in-progress the first VLAN group unless the address that has been actually used by the VLAN client terminal and the virtual address belong to the same address system.

Furthermore, when the data transfer is performed between the VLAN devices via the VLAN session using the virtual address, the operation of the VLAN device and the relay server connected to the VLAN device may be suspended. In this case, in the relay communication system of this preferred embodiment, the suspension of the operation of the VLAN device or the relay server in the activated VLAN group can preferably be quickly reflected on the VLAN session.

Although specific preferred embodiments according to the present invention were explained above, the present invention is not limited to the above-described preferred embodiments. The preferred embodiments can be altered in various ways without departing from the scope of the present invention. Particularly, a plurality of preferred embodiments and variations can be arbitrarily combined with each other as necessary.

For example, a client terminal registered in the relay server information can log in remotely via other relay servers other than a relay server to which the client terminal is connected, if the relay server constitutes the same relay group. Accordingly, the VLAN client terminal can log in via different relay servers between when creating the VLAN group information and when activating the VLAN group. The state of the client terminal logging in via the other relay server is shared among the relay servers and the client terminals activated in the same relay group by sharing the same relay server information.

In the above-described case, the VLAN group information update unit 235 of the client terminal updates, receiving the selection of the VLAN group to be activated, the session information to session information including a relay server which has received the remote log-in. Then, the VLAN group information update unit 235 allows the VLAN client terminals and relay severs to which the VLAN client terminal is connected to share the updated VLAN group information.

For example, it is assumed that the first relay group includes the fourth relay server to which the VLAN client terminal is not connected, in addition to the first relay server A, the second relay server B, and the third relay server C. In this first relay group, if the first client terminal A1 remotely logs into the first relay group via the fourth relay server instead of the first relay server A, the shared session information does not include the identification information of the fourth relay server.

Therefore, when receiving the activation instruction of the VLAN group in the above-described state, the VLAN group information update unit 235 adds the identification information of the fourth relay server to the hub information of the session information. In addition, the VLAN group information update unit 235 creates routing information between the fourth relay server and another relay server to which the VLAN device is connected, and updates the session information of the VLAN group information. Then, the VLAN group information update unit 235 transmits the updated VLAN group information to the VLAN devices and the relay servers to which the VLAN devices are connected.

Preferred embodiments of the present invention can be applied to a relay server communication system including a plurality of relay servers that can communicate with each other, a plurality of client terminals, LANs connecting the client terminals to the relay servers, and to a relay server used in the relay server communication system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A relay communication system comprising:
   a first network;
   a second network;
   a first relay server connected to the first network;
   a second relay server connected to the second network, and configured to communicate with the first relay server via a third network;
   one or more client terminals connected to the first relay server via the first network; and
   one or more client terminals connected to the second relay server via the second network; wherein
   each of the first relay server, the second relay server, the one or more client terminals connected to the first relay server, and the one or more client terminals connected to the second relay server includes:
      a relay group information storage unit configured to store relay group information that indicates the first relay server, the second relay server, the one or more client terminals connected to the first relay server and one or more client terminals connected to the second relay server define a relay group;
      a relay server information storage unit configured to store relay server information including activation information of the first relay server, activation information of the second relay server, activation/registration information of the one or more client terminals connected to the first relay server, and activation/registration information of the one or more client terminals connected to the second relay server;
      an information sharing unit configured to allow the first relay server, the second relay server, the one or more client terminals connected to the first relay server, and the one or more client terminals connected to the second relay server, to share the relay group information and the relay server information;
      a VLAN group information control unit programmed and configured to allow VLAN client terminals defining a VLAN group in the relay group to share VLAN group information, at least two of the one or more client terminals connected to the first relay server and the one or more client terminals connected to the second relay server being the VLAN client terminals, the VLAN group information including hub information including identification information of the first relay server and identification information of the second relay server, to which the VLAN client terminal is connected, session information that indicates a connecting-side and a connected-side of a session established between the first relay server and the second relay server, and identification information that identifies the VLAN client terminals;
   each of the first relay server and the second relay server further includes:
      an activation command control unit programmed and configured to transmit a response signal including address information of a VLAN device as an activatable VLAN client terminal in a case of receiving an activation instruction of the VLAN group;
      a VLAN session control unit programmed and configured to establish a hub session as a VLAN session between the first relay server and the second relay server based on the session information, and establish a device session as a VLAN session between the first relay server or the second relay server and the VLAN device that is connected to the first relay server or the second relay server; and
      a suspension processing unit programmed and configured to provide notification of suspension of the VLAN device;
   each of the one or more client terminals connected to the first relay server and the one or more client terminals connected to the second relay server further including a virtual address control unit programmed and configured to create virtual address information related to the VLAN device based on the response signal, and transmit the virtual address information to the VLAN device; and during a time when at least two VLAN devices are communicating with each other using the virtual address information and the VLAN session, if the suspension processing unit provides notification of the suspension of the VLAN device, the virtual address control unit deletes the VLAN device about which the suspension has been notified from the virtual address information, and the VLAN session control unit is configured to close the VLAN session related to the VLAN device about which the suspension has been notified.

2. The relay communication system according to claim 1, wherein, if operation of the first relay server or the second relay server is suspended during a time when at least two VLAN devices are communicating with each other using the virtual address information and the VLAN session, the suspension processing unit is programmed and configured to provide notification of suspension of the one or more VLAN devices connected to the suspended first relay server or the one or more VLAN devices connected to the suspended second relay server.

3. The relay communication system according to claim 1, wherein the suspension processing unit determines a number of the VLAN devices which are activated except the VLAN device about which the suspension has been notified, and if the number of the activated VLAN devices is one or less, the VLAN session control unit closes all of the VLAN sessions established in the VLAN group.

4. The relay communication system according to claim 1, wherein the virtual address information includes a virtual IP address and a virtual MAC address provided to the VLAN device.

5. A relay server configured to serve as a second relay server connected to a second network, and communicate with a first relay server connected to a first network, the relay server comprising:

a relay group information storage unit configured to store relay group information that indicates the first relay server, the second relay server, one or more client terminals connected to the first relay serer via the first network, and one or more client terminals connected to the second relay server via the second network define a relay group;

a relay server information storage unit configured to store relay server information including activation information of the first relay server, activation information of the second relay server, activation/registration information of the one or more client terminals connected to the first relay server, and activation/registration information of the one or more client terminals connected to the second relay server;

an information sharing unit configured to allow the first relay server, the second relay server, the one or more client terminals connected to the first relay server, and one or more client terminals connected to the second relay server, to share the relay group information and the relay server information;

a VLAN group information control unit programmed and configured to allow VLAN client terminals defining a VLAN group in the relay group to share VLAN group information, at least two of the one or more client terminals connected to the first relay server and the one or more client terminals connected to the second relay server being the VLAN client terminals, and the VLAN group information including hub information including identification information of the first relay server and identification information of the second relay server, to which the VLAN client terminal is connected, session information that indicates a connecting-side and a connected-side of a session established between the first relay server and the second relay server, and identification information that identifies the VLAN client terminals;

an activation command control unit programmed and configured to transmit a response signal including address information of a VLAN device as an activatable VLAN client terminal in a case of receiving an activation instruction of the VLAN group;

a VLAN session control unit programmed and configured to establish a hub session as a VLAN session between the first relay server and the second relay server based on the session information, and establish a device session as a VLAN session with the VLAN device connected to the second relay server;

a relay server communication control unit programmed and configured to control communication between the VLAN devices, the communication being performed using virtual address information created for a VLAN device as an activatable VLAN client terminal among the VLAN client terminals defining the VLAN group based on the response signal, and the VLAN session; and a suspension processing unit programmed and configured to provide notification of suspension of the VLAN device; wherein if the suspension processing unit provides notification of suspension of the VLAN device, during a time when at least two VLAN devices are communicating with each other using the virtual address information and the VLAN session, the VLAN session control unit is programmed and configured to close the VLAN session related to the VLAN device about which suspension has been notified.

6. The relay server according to claim 5, wherein, if operation of the first relay server or the second relay server is suspended during a time when at least two VLAN devices are communicating with each other using the virtual address information and the VLAN session, the suspension processing unit is programmed and configured to provide notification of suspension of the one or more VLAN devices connected to the suspended first relay server or the one or more VLAN devices connected to the suspended second relay server.

7. The relay server according to claim 5 wherein the suspension processing unit determines a number of the activated VLAN devices except the VLAN device about which suspension has been notified, and if the number of the activated VLAN devices is one or less, the VLAN session control unit configured to close all of the VLAN sessions established in the VLAN group.

8. The relay server according to any of claim 5, wherein the virtual address information includes a virtual IP address and a virtual MAC address given to the VLAN device.

* * * * *